(12) United States Patent
Patel et al.

(10) Patent No.: US 7,962,363 B2
(45) Date of Patent: Jun. 14, 2011

(54) ONLINE MEDIA EXCHANGE

(75) Inventors: Dorab Patel, Santa Monica, CA (US); Scott D. Kalter, Malibu, CA (US); Uzi Eliahou, Topanga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2285 days.

(21) Appl. No.: 10/303,167

(22) Filed: Nov. 22, 2002

(65) Prior Publication Data
US 2004/0103024 A1    May 27, 2004
US 2010/0082439 A9    Apr. 1, 2010

Related U.S. Application Data

(63) Continuation of application No. PCT/US01/16927, filed on May 24, 2001.

(60) Provisional application No. 60/206,944, filed on May 25, 2000.

(51) Int. Cl.
*G06Q 30/00* (2006.01)

(52) U.S. Cl. ........... 705/14.4; 705/14.69; 705/14.46; 705/14.71; 705/10

(58) Field of Classification Search .......... 705/14, 705/14.4–14.73
See application file for complete search history.

(56) References Cited

U.S. PATENT DOCUMENTS

| | | | |
|---|---|---|---|
| 5,659,732 A | 8/1997 | Kirsch | |
| 5,717,923 A | 2/1998 | Dedrick | |
| 5,724,424 A | 3/1998 | Gifford | |
| 5,724,521 A | 3/1998 | Dedrick | 395/226 |
| 5,724,524 A | 3/1998 | Hunt et al. | |
| 5,748,954 A | 5/1998 | Mauldin | |
| 5,752,238 A | 5/1998 | Dedrick | |
| 5,768,521 A | 6/1998 | Dedrick | |
| 5,794,210 A | 8/1998 | Goldhaber et al. | |
| 5,826,241 A | 10/1998 | Stein et al. | |
| 5,848,397 A | 12/1998 | Marsh et al. | |
| 5,848,407 A | 12/1998 | Ishikawa et al. | |
| 5,852,820 A | 12/1998 | Burrows | |
| 5,855,008 A | 12/1998 | Goldhaber et al. | |
| 5,864,845 A | 1/1999 | Voorhees et al. | |
| 5,864,846 A | 1/1999 | Voorhees et al. | |
| 5,903,882 A | 5/1999 | Asay et al. | |
| 5,918,014 A | 6/1999 | Robinson | |
| 5,920,854 A | 7/1999 | Kirsch et al. | |

(Continued)

FOREIGN PATENT DOCUMENTS

JP    2001-250052    9/2001

(Continued)

OTHER PUBLICATIONS

Engage Media Delivers Double the Industry Standard for Click-Through Rates—Latest Research Reinforces Proven Optimization Methodology Business Wire, Aug. 2, 2000.*

(Continued)

*Primary Examiner* — Khanh H Le
(74) *Attorney, Agent, or Firm* — Brinks Hofer Gilson & Lione

(57) ABSTRACT

A data processing system enables a network of interconnected public access computers (250) to act as a continuous transactional exchange for electronic advertising. The system customizes paid advertising, enabling dynamic pricing and price discovery. The system provides extensive real-time tracking which supports a hybrid pay for performance model as well as a process for multi-stage optimization.

17 Claims, 27 Drawing Sheets

U.S. PATENT DOCUMENTS

| | | | |
|---|---|---|---|
| 5,920,859 | A | 7/1999 | Li |
| 5,948,061 | A * | 9/1999 | Merriman et al. ............ 709/219 |
| 6,078,866 | A | 6/2000 | Buck et al. |
| 6,131,087 | A * | 10/2000 | Luke et al. ...................... 705/26 |
| 6,182,050 | B1 * | 1/2001 | Ballard ...................... 705/14.61 |
| 6,189,030 | B1 * | 2/2001 | Kirsch et al. .................. 709/224 |
| 6,269,361 | B1 | 7/2001 | Davis et al. |
| 6,460,036 | B1 * | 10/2002 | Herz .............................. 707/10 |
| 6,502,076 | B1 * | 12/2002 | Smith ........................ 705/14.54 |
| 6,571,279 | B1 * | 5/2003 | Herz et al. ..................... 709/217 |
| 6,785,659 | B1 * | 8/2004 | Landsman et al. ......... 705/14.73 |
| 7,003,734 | B1 * | 2/2006 | Gardner et al. ............... 715/808 |
| 7,031,932 | B1 * | 4/2006 | Lipsky et al. .............. 705/14.41 |
| 7,483,871 | B2 * | 1/2009 | Herz ................................ 707/2 |
| 2001/0013043 | A1 * | 8/2001 | Wagner ......................... 707/511 |
| 2001/0037205 | A1 * | 11/2001 | Joao ................................ 705/1 |
| 2002/0004735 | A1 | 1/2002 | Gross |
| 2002/0072971 | A1 * | 6/2002 | DeBusk et al. ................. 705/14 |
| 2002/0099600 | A1 * | 7/2002 | Merriman et al. .............. 705/14 |
| 2002/0128959 | A1 * | 9/2002 | Kostic et al. .................... 705/37 |
| 2003/0023488 | A1 * | 1/2003 | Landsman et al. ............. 705/14 |
| 2003/0195837 | A1 * | 10/2003 | Kostic et al. .................... 705/37 |
| 2005/0091111 | A1 * | 4/2005 | Green et al. .................... 705/14 |
| 2005/0114229 | A1 * | 5/2005 | Ackley et al. ................... 705/26 |
| 2008/0077478 | A1 * | 3/2008 | Kim ............................... 705/10 |

FOREIGN PATENT DOCUMENTS

| | | |
|---|---|---|
| WO | WO 98/34189 A1 | 8/1998 |
| WO | WO 99/20486 | 9/1999 |
| WO | WO 99/48028 | 9/1999 |
| WO | WO 99/62013 A1 | 12/1999 |
| WO | WO 00/16218 | 3/2000 |
| WO | WO 00/41090 | 7/2000 |

OTHER PUBLICATIONS

Examination report for counterpart European patent application No. 01939427.9, dated Mar. 3, 2005, 3 pages.
Examination report for counterpart Canadian patent application No. 2,409,995, dated Dec. 13, 2004, 3 pages.
Kohda, Y. et al., "Ubiquitous advertising on the WWW: Merging advertisement on the browser," Computer Networks and ISDN Systems, North Holland Publishing, Amsterdam, NL, vol. 28, No. 11, May 1996, 7 pages.
Examination report for counterpart Canadian patent application No. 2,409,995, dated Dec. 13, 2004, 3 pages.
Examination report for counterpart Australian patent application No. 2001264947, dated Nov. 16, 2004, 1 page.
Database of Corporate ResourceNet, "New Service Puts An Auction Search Engine Under One Roof", Electronic Advertising & Marketplace Report, vol. 12, Issue 8, Apr. 1998, p. 6.
Espe, "Online Search Engines Start to Charge for Listings", Washington Business Journal, vol. 18, Issue 1, May 1999, p. 31.
Dawson et al., "2 Search Sites Narrow Their Parameters", Adweek-Western Edition, vol. 48, Issue 42, Oct. 1998, p. 1.
Database of Corporate ResourceNet, "Bits", from Adweek-Eastern Edition, vol. 40, Issue 14, Apr. 1999, p. 46.
Komando, "Searching for Search Engines—from Dogpile to Deja News", Business First-Colombus, vol. 14, Issue 43, Jun. 1998, p. 46.
Database of Corporate ResourceNet, New services Aim to Boost Efficiency of Search Engines, Electronic Advertising & Marketplace Report, vol. 12, Issue 13, Jun. 1998, p. 6.
Database of Corporate ResourceNet, "Goto.com Chooses Quest's SharePlex(R) for Oracle Software to Ensure Uptime for Business-Critical Web Site", PR Newswire, Jun. 2000.
Database of Corporate ResourceNet, "Capitalist Tool", Time Canada, vol. 151, Issue 8. Mar. 1998, p. 41.
Database of DialogClassic(m), :Homestead Technologies' Continued Success Draws $17.50 Million in second Round of Venture Funding, PR Newswire, Apr. 1999.
"APS Search Tools—Patent Search Client Strategy", by US Patent & Trademark Office, Sep. 1997.
"Frequently Asked Questions NT Image Search & Retrieval (IS&R)", by US Patent & Trademark Office, Dec. 1997.

"Chapter 1—Introduction to Dialog", by Dialog Information Service, Inc. pp. 1-1 to 1-14.
"Automated Patent System (APS) Workstation Reference Manual", by US Patent & Trademark Office, Jul. 1996.
Frentzen, Jeff, "Help for Getting the Word Out About Web Sites", PC Week, v14, n46, p. 27(1), Nov. 3, 1997.
Miller, Karen L., "Improve Your Ranking (Building Web Sites to Attract Web Searches)", Home Office Computer, v16, n1, p. 51(2) Jan. 1998.
Wingfiled, "Another Engine Takes Ads by the Click", from http://www.news.com?news/Item/0.4.1387,00/html, May 1996.
Pelline, "New Search Engine Goes Commercial", by CNET News.com, Feb. 1998.
Wang, "Engines Battle Irrelevance of Results—New Search Service Hope to Fill the Void", by Internet World, Feb. 1998.
Vondr Haar, "Searching for the Highest Bidder", from Inter@active week.
Riedman, "Search Engine Startup to Auction Listings", from Interactive-Advertising, Feb. 1998.
Rich, "New Search Engine Allows Sites to Pay Their Way to Top", from http://www.adweek.com/iq/iqnews02.asp.
Mardesich, "Web Site Operators Pay for Top Billing-Search Engine Allows Site Sponsors to Buy Place on Special List", from Knight Ridder Newspapers, Mar. 1998.
Hilty, "GoTo.Hell—What Happens When on Line Search Engine Accepts Cash From Web Sites?" from http://www.ocweekly.com/link/archives/97/27/byte-3.11.98-1.html, Mar. 1998.
Flynn, "With GoTo.com's Search Engine, the Highest Bidder Shall Be Ranked First", by the New York Times, Mar. 1998.
Clark, "Start-Up Plans Internet Search Service Tying Results to Advertising Spending", from the Wall Street Journal, Feb. 1998.
"Going, Going . . . ", from A Closer Look of the Wall Street Journal-Marketplace, Apr. 1998.
"Coursey.com", David Coursey's Insider report on Personal Computing, the Internet and Communications, Mar. 1998.
Glaser, "Who Will GoTo.com", from OnlinePress.com, Feb. 1998.
Mardesic, "Search Engine Charges Hit Sites", from http://www.sjmercury.com/business/center/goti022198.html, Feb. 1998.
"News Watch About Search Engines", from http://searchenginewatch.com/ness.html, Feb. 1998.
Wang, "Engines Battle Irrelevence of Results", from Internet World.
Swartz, "Browser Only Lists Paying Web Sites Critics Fear Approach Will Squeeze Out Most Small Internet Players", from http://www.sfgate.com/cgi-bin/ publish on San Francisco Chronicle, Feb. 1998.
McWilliams, PC World Online, Feb. 23, 1998, "Search Engine to Sell Top Positions on Results Lists", from http://www.pcworld.com/news/daily/data/ 0298/....html.
"Search Engine Start Up to Auction Listings", from http://www.adage.com/interactive/daily/index/html, Feb. 1998.
Alyson, "Searching the Search Engines", from Bacon's, May 1998.
Pelline, "Pay-for-placement gets another shot", from http://www.newscom.?news/item/0,4,19307,00.html, Sep. 1997.
IBM Technical Disclosure Bulletin, "Organizing a Ranked List of Search Matches", Nov. 1994.
Jeffrey Brewer, ClickZ Today, Aug. 18, 1998, "Pay-For-Performance: Creating More and Better Value", obtained at the internet address http://www.clickz.com, Aug. 18, 1998.
Jesse Berst, ZDNet, Aug. 17, 1998, "Search Sites' Shocking Secret", obtained at the internet address http://www.zdnet.com/anchordesk/story/story_2432.html, Aug. 17, 1998.
Sara Fisher, "Budding Internet Firm Finds Niche in Satisfaction", L.A. Business Journal, Aug. 10, 1998.
"Disclosure Rules", The Industry Standard—The Newsmagazine of the Internet Economy, Aug. 10, 1998.
G. David Doran, "Pay to Play", Entrepreneur, Jul. 1998, p. 18.
Advertising Age-Interactive Daily Homepage; obtained at the internet address http://www.adage.com/interactive/daily/index.html, Jun. 8, 1998.
Kim Komando, "With About 320 Million Sites, Search Engines Offer Some Help", copyright 1998, Los Angeles Times Syndication.
Margot Williams, "How to Ease Your Online Searches", Lansing State Journal, Jun. 1, 1998.

"GoTo.com Gets Venture Funding", Internet World Magazine, Jun. 1, 1998.
Sasha Alyson, "Searching the Search Engines", Front Page, May 8, 1998.
Advertising Age-Interactive Daily Homepage, Feb. 23, 1998, "Search Engine Startup to Auction Listings", obtained at the internet address http://www.adage.com/interactive/mdaily/index.html.
Brian McWilliams, PC World Online, Feb. 23, 1998, "Search Engine to Sell Top Positions on Results Lists", obtained at the internet address http://www.pcworld.com/news/daily/data/0298/9880223173204.html.
Jon Swartz, San Francisco Chronicle, Feb. 23, 1998, "Browser Only Lists Paying Web Sites Critics Fear Approach Will Squeeze Out Most Small Internet Players", obtained at the internet address http://www.sfgate.com/cgi-bin/arti...Ie/archive/1998/02/21/BU102470.DTL.
Nelson Wang, "Engines Battle Irrelevance of Results", from http://www.internetworld,com/print/current/news/19980223-battle.html, Feb. 1998.
Search Engine Watch, Feb. 21, 1998, "GoTo Sells Positions", obtained at the internet address http://www.searchenginewatch.com/news.html, Feb. 23, 1998.
Jodi Mardesich, "Search Engine Charges Hit Sites", from http://wwww.sjmercury.com/businrss/center/goto022198.html, Feb. 1998.
Ken Glaser, Who Will GoTo.com?, OnlinePress.com, Feb. 1998.
Jeff Pelline, "New Search Engine Goes Commercial", from http://www.news.com/News/Item/ 0,4, 19281,00.html, Feb. 20, 1998.
"Going, Going . . . ", The Wall Street Journal, Apr. 1998. p. B1.
David Coursey, "Coursey.com", Mar. 1998.
Don Clark, "Start-Up Plans Internet Search Service Tying Results to Advertising Spending", The Wall Street Journal, Feb. 20, 1998.
Laurie J. Flynn, "With GoTo.com's Search Engine, The Highest Bidder Shall Be Ranked First", The New York Times, Mar. 1998, p. C1.
Wyn Hilty, OCWeekly byte marks, "GoTo.Hell", from http://www.ocweekly.com/ink/archives/97/27byte-3.11.98-1.shtml, Mar. 13, 1998.
Jodi Mardesich, "Web Site Operators Pay for Top Billing", The News—Herald (Willoughby, OH), Mar. 2, 1998.
Laura Rich, Adweek Online IQ News Online, Feb. 23, 1998, "New Search Engine Allows Sites to Pay Their Way to Top", from http://www.adweek.com/iq/ iqnews02.asp, Feb. 1998.
Patricia Riedman, "Search Engine Startup to Auction Listings", Advertising Age Magazine, Feb. 23, 1998, p. 34.
Steven Vonder Haar, ZDNet,com, Feb. 19, 1998, "Searching for the Highest Bidder", obtained at the internet address http://www.zdnet.com/intweek/daily/980219i.html, Feb. 23, 1998.
Nelson Wang, "Engines Battle Irrelevance of Results", Internet World, Feb. 10, 1998, p. 1.
Interactive Week Magazine, Garden City, N. Y. May 25, 1998.
Jeff Pelline, "New Search Engine Goes Commerical", CNET News.com, from http://www.news.com/News/Item/0,4,19281,00.html, Feb. 20, 1998.
Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999.
Nick Wingfield, Staff Writer, CNET News.com, May 22, 1996, "Another Engine Takes Ads by the Click", obtained at the internet address http://www.news.com/News/Item/0,4,1387,00.html, Jul. 29, 1999.
Rose Aguilar, Staff Writer, CNET News.com, Apr. 29, 1996, "New Ad Model Charges by the Click", obtained at the internet address http://www.news.com/News/Item/0,4,1199,00.html, Jul. 29, 1999.
Alex Lash, Staff Writer, CNET News.com, Dec. 11, 1996, "Open Text Updates Tools", obtained at the internet address http://www.news.com/News/Item/0,4,6118,00.html, Jul. 29, 1999.
"About SearchUP, Inc.", Jul. 15, 1999, obtained at the internet address http://www.searchup.com/about.cfm.
"Testimonials"., Jul. 15, 1999, obtained at the internet address http://www.searchup.com/testimonials.cfm.
"Benefits", Jul. 15, 1999, obtained at the internet address http://www.searchup.com/benefits.cfm.
"Information", Jul. 15, 1999, obtained at the internet address http://www.searchup.com/information.cfm.
"Tips & Tricks", Jul. 15, 1999, obtained at the internet address http://www.searchup.com/tipsandtricks.cfm.
Correspondence from Bryan Buck, President of SearchUp.com, Jul. 7, 1999.
Saul Hansell "Alta Vista Invites Advertisers to Pay for Top Ranking", The New York Times, Apr. 15, 1999, p. C2.
Galore—Super Search Engine, May 21, 1999, obtained at the internet address http://www.galore.com/1/mainframe.shtml.
hitsgalore.com Search Engine, May 21, 1999, obtained at the internet address http://www.hitsgalore.com.
I Seek It "The Next Generation Search Engine", May 21, 1999, obtained at the internet address http://www.iseekit.com.
Correspondence from Emilia F. Cannella to Robert Brahms, CEO of BeFirst Internet Corporation regarding findwhat.com, Jul. 20, 1999.
Correspondence from Emilia F. Cannella to Michael Melcher, MC Services regarding SearchUP.com, Jul. 1, 1999.
Correspondence from Emilia F. Cannella to Robert G. Schuler, Esq., Kegler, Brown, Hill & Ritter regarding iseekit.com, Jul. 1, 1999.
Correspondence from Emilia F. Cannella to Andrew Conru, Vote Publishing regarding galore.com, Jun. 30, 1999.
SearchUP.com—Internet Directory, Automated Bid Placement System, obtained at the internet address http://www.searchup.com/search.cfm, Aug. 25, 1999.
SearchUP: URL Position Manager, obtained at the internet address https://www.securearea.net/searchup/login.cfm, Aug. 25, 1999.
SearchUP: URL Position Manager, obtained at the internet address https://www.securearea.net/searchup/newaccount.cfm, Aug. 25, 1999.
SearchUP: URL Position Manager, obtained at the internet address https://www.securearea.net/getaccount/login.cfm, Aug. 25, 1999.
Correspondence from Emilia F. Cannella to Mr. D. Reed, Reports Galore, regarding hitsgalore.com, Jun. 30, 1999.
Miller, Karen L., "Improve Your Ranking", Home Office Computer, vol. 16, No. 1, Jan. 1998, p. 51(2).
Jeff Fretzen, "Help for Getting the Word Out About Web Sites", PC Week, vol. 14, No. 46, Nov. 3, 1997, p. 27(1).
Article from the Search Engine Report, "GoTo to Sell Positions", Mar. 3, 1998, http://www.searchenginewatch.com/sereport/9803-to-to-html.
Article from CNET News, "Engine Sells Results, Draws Fire", Jun. 21, 1996, http://www.nees.com/News?Item/0,4,1635,00.html.
Press release on Lightweight Directory Access protocol (LDAP), Netscape Comm. Corp. Mountain View, CA., Apr. 1996.
ClickMail Central directory, circa Apr. 1996.
GoTo.com, circa 1998, at www.goto.com.
Northern Light, circa 1997-1998, at sirocco.northernlight.com.
Laura Rich, Adweek Online IQ News Online, Feb. 23, 1998, "New Search Engine Allows Sites to Pay Their Way to Top", from http://www.adweek.com/iq/ iqnews02.asp, Feb. 23, 1998.
Smith, Laura B., article "Going . . . Gone", PC Week, vol. 13, No. 34, Aug. 26, 1996, p. E1 (2), http://www.dialog-classic.com/DialogClassic/dialog.
Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.
Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw> on Nov. 9, 2000, 2 pages.
Ubois, Jeff, article titled "He who pays the piper . . . ", *MIDRANGE Systems*, vol. 9, No. 12, 1996, p. 50 (1), reprinted by Cardinal Business Media, Inc.
Examination report issued in Canadian counterpart application No. 2,409,995, Oct. 1, 2007, 4 pages.

* cited by examiner

Internet Client-Server Architecture

ADVERTISER SITE FLOW

ADVERTISER PROCESS

PUBLISHER SITE FLOW

Publisher Process

Billing Overview

Advertiser and Publisher Process and Automation

Advertising Payment Models

Offers and Contracts on the Exchange

System Architecture

Advertiser Home Page

| Header: | Customized User Info + Customized Corporate Info | | | |
|---|---|---|---|---|
| ◎ Home / My Home | Month to date No. of Impressions | 1,000,000 | Month to date No. of Clicks | 200,000 |
| ◎ Manage Offers | Month to date No. of Leads | 20,000 | Month to date No. of Sales | 10,000 |
| ◎ Manage Banners | Month to date Accrued Sales | $2,000,000.00 | Month to date Accrued Commission | $80,000.00 |
| ◎ Manage Checkouts | Financial Activity for Last 3 Months | | | |
| ◎ Manage Account | | | | |
| ◎ Manage Alerts | List of Current Offers | | | |
| ◎ Customer Service | (filtered and sorted) | | | |
| ◎ Research | | | | |
| ◎ Glossary | | | | |
| ◎ Terms & Conditions | Promo | | | |
| ◎ Logout | | | | |

FIGURE 18

Offer Management Page

| Header: | Customized User Info + Customized Corporate Info |
|---|---|

- ○ Home / My Home
- ● Manage Offers
- ○ Manage Banners
- ○ Manage Checkouts
- ○ Manage Account
- ○ Manage Alerts
- ○ Customer Service
- ○ Research
- ○ Glossary
- ○ Terms & Conditions
- ○ Logout Filter / Sort criteria — Delete

- Offer Summary — [View Detail / Edit] [Enable / Disable] □
- Offer Summary — [View Detail / Edit] [Enable / Disable] □
- Offer Summary — [View Detail / Edit] [Enable / Disable] □
- Offer Summary — [View Detail / Edit] [Enable / Disable] □
- Offer Summary — [View Detail / Edit] [Enable / Disable] □

[New]

[Sumit]

FIGURE 19

Offer Editor Page

| Header: | Customized User Info + Customized Corporate Info |
|---|---|

- ◎ Home / My Home
- ◎ Manage Offers
- ◎ Manage Banners
- ◎ Manage Checkouts
- ◎ Manage Account
- ◎ Manage Alerts
- ◎ Customer Service
- ◎ Research
- ◎ Glossary
- ◎ Terms & Conditions
- ◎ Logout Offer Details Product Details Banner Details (View) (New)

Target URLs (View) (New)

Commission Details

Offer Limits

Content Profile

Target Audience

[Reset] [Cancel] [Save] [Save-As]

FIGURE 20

Banner Management Page

| Header: | Customized User Info + Customized Corporate Info |
|---|---|

- ○ Home / My Home
- ○ Manage Offers
- ● Manage Banners
- ○ Manage Checkouts
- ○ Manage Account
- ○ Manage Alerts
- ○ Customer Service
- ○ Research
- ○ Glossary
- ○ Terms & Conditions
- ○ Logout Delete

| Banner Name | | | | |
|---|---|---|---|---|
| Creative | Hight x Width | kb | Static / Animated | ☐ |
| Alt. Tag | | | | |

| Banner Name | | | | |
|---|---|---|---|---|
| Creative | Hight x Width | kb | Static / Animated | ☐ |
| Alt. Tag | | | | |

| Banner Name | | | | |
|---|---|---|---|---|
| Creative | Hight x Width | kb | Static / Animated | ☐ |
| Alt. Tag | | | | |

( New )

( Sumit )

FIGURE 21

Banner Editor Page

| Header: | Customized User Info + Customized Corporate Info |
|---|---|

- ◎ Home / My Home
- ◎ Manage Offers
- ◎ Manage Banners
- ◎ Manage Checkouts
- ◎ Manage Account
- ◎ Manage Alerts
- ◎ Customer Service
- ◎ Research
- ◎ Glossary
- ◎ Terms & Conditions
- ◎ Logout Banner Name: [ ]

Creative:

Upload From: [ ] (Browse)
Save As: [ ] (Browse)
(View)

Dimensions: [Width] [Hight] (Calculate)
Size: [kb] kb
Attributes: [Attrib.]

Alt. Tag: [ ]

(Cancel) (Sumit)

FIGURE 22

URL Management Page

| Header: | Customized User Info + Customized Corporate Info |

- ◎ Home / My Home
- ◎ Manage Offers
- ◎ Manage Banners
- ● Manage Checkouts
- ◎ Manage Account
- ◎ Manage Alerts
- ◎ Customer Service
- ◎ Research
- ◎ Glossary
- ◎ Terms & Conditions
- ◎ Logout Delete IP Address / Event Type  [View] ☐
   Lead URL
   Other URL
   Sale URL (checkout)

IP Address / Event Type  [View] ☐

IP Address / Event Type  [View] ☐

IP Address / Event Type  [View] ☐

[New]  [Sumit]

FIGURE 23

Physical Network Diagram

Alternative Exchange Architecture

ONLINE MEDIA EXCHANGE

CROSS REFERENCE TO RELATED APPLICATIONS

This application is a continuation of Application No. PCT/US01/16927, filed on May 24, 2001, which claims priority to U.S. provisional application 60/206,944, filed 25 May 2000, the content of which is incorporated by reference.

BACKGROUND

The explosion of Internet activity over the past few years has created enormous growth for advertising on the Internet. The current market is however is very fragmented (many buyers and sellers who cannot find each other), inefficiencies and non-transparency exist (trading information, especially pricing information is often hidden from the participants).

The Internet operates on a client/server model. In this model, a client computer communicates with a server computer on which information resides and the client computer depends on the server to deliver requested information and services. These services may involve handling incoming and outgoing email, providing advertisements, and conducting e-commerce. Other examples of these services are searching for information and sending it back to the client (such as when a database on the Web is queried), and delivering web pages for a web site. The servers (also known as hosts) are usually more powerful computers that store the data and databases.

The web sites that make up the World Wide Web need to have unique locations so that a client computer can locate them to request services such as retrieving email, files, web pages, and other information. The unique identifier for a host computer is called an IP (Internet Protocol) address and the unique identifier for a web site (web page) is called the URL (Uniform Resource Locator). A URL indicates where the host computer is located, the location of the web site on the host, and the name of the web page and the file type of each document, among other information.

A common form of Internet advertising is known as banner ads. These banner ads are frequently seen stretching across the top of a web page. Many large sites, such as Alta Vista, Yahoo, and CNN, host banner ads. Typically, there are three parties involved in making banner advertising work.

An advertiser is someone trying to build a brand name (branders) or to sell a product or service (direct marketers). For example, the marketplace knows that Dell sells computers and Price Waterhouse sells accounting services. Advertisers develop individual ads or groups of coordinated ads called campaigns. The text and artwork comprising an ad are known as the ad copy and creative respectively. Advertisers need to have these ads distributed so that consumers will see them. For this distribution, they rely on publishers.

A publisher provides content that consumers want or need. For example, the New York Times provides news, ZDnet provides computer information, Disney's Go Network provides entertainment content. Content attracts consumers. Publishers make space available next to their content to sell to advertisers.

In this context, a consumer is anyone with Internet access, such as a web browser. A consumer visits a site to see the content provided by the publisher. While there, the consumer is attracted to an ad and clicks on it to see more information. The act of clicking normally directs the consumer's browser to the advertiser's web site, as shown in FIG. 2. There, the consumer can find information, register to get even more information, download trial software, or purchase merchandise. Advertisers get paying customers resulting from the distributed ads. Publishers get paid for their ad inventory. Consumers get content (often paid for by the advertisers).

2.1 Advertising Trading Models

In traditional advertising, there is one primary way to sell advertising space such as a column in a newspaper, a page in a magazine, a radio or television spot, or a billboard. An advertiser may buy five column inches, a quarter page, or a 30 second spot. In all cases, the space for an advertisement is bought and sold.

Internet advertising started out in much the same way. The primary space on the Internet for advertising is the impression. An impression refers to a consumer viewing an ad on a publisher's page. If ten consumers visit the same page and see the same ad, then ten impressions have been delivered. To make advertising more effective, the banner for a particular page usually rotates. This means that one of many different ads may appear each time the web page is viewed. Since the value of a single impression is small, a deal between a publisher and an advertiser may involve millions of impressions. The cost for this space is known as cost per thousand impressions or CPM. CPM rates range from just a few dollars to several dollars. However, the Internet provides a unique opportunity for trying other models of selling advertising space, and other models have already begun to emerge. Three different models are discussed below, CPM, CPA, and Inverted CPA. The following figure (FIG. 12) describes the abstract steps followed in each model, and thus highlights their differences.

2.2 CPM Model

The goal of advertisers is sales and/or branding. The goal of the publishers is to sell their ad inventory at the best price. Buying and selling ad inventory according to impressions is a legacy of traditional advertising media, where it was difficult or impossible to measure the effectiveness of the advertising. The price a publisher can charge is affected by the perceived effectiveness of the advertising. For example, publishers can say that their audience includes some number of people with some specified characteristics. These people are assumed to be likely to buy the particular product being advertised. Advertisers currently predict the effectiveness of the advertising using historical data, test marketing, and guess-work. This is then used to predict return-on-investment (ROI) and to negotiate terms with a publisher. The negotiations are complicated by inconsistencies in definition (e.g., when, exactly, is an impression considered to be delivered), and the need to qualify ad delivery by parameters including:

1. Guaranteed delivery of a specific number of impressions within a certain time.
2. Frequency (how many times a single viewer will see the ad in a certain period).
3. Location of the ads on a site and within a page.
4. Target audience specification. Note that publishers cannot guarantee that only the desired audience will see the ads to a consumer viewing an ad on a publisher. In order to have some control over their ROI in the CPM model, advertisers are forced to contractually obligate publishers to deliver their ads according to these specific parameters.

On the other hand, publishers need to estimate how much of their available inventory matches the advertiser's specifications so that they know how much to sell. This is not always easy, since the categories are overlapping. Publishers should implement tools and processes to satisfy advertisers that the requested specifications are being met. This involves choices of ad serving technology, gathering data about their audience, and organizing the layout of their pages. To maintain control over their site and audience, publishers impose constraints on advertisers regarding the size, type, and animation qualities of their creative executions. Publishers are concerned that their audience will be alienated by ads that are too distracting or slow to load.

The traditional CPM approach leads to a short-term misalignment between the interests of the advertisers and those of the publishers. Once a publisher has sold their inventory to an advertiser, they are less concerned about the effectiveness of the advertising. They have less motivation to help the advertiser be more effective. Of course, in the long run, publishers should be concerned. If the advertising on their site is continually ineffective, advertisers will be reluctant to place ads on their site.

Typically (see FIG. 12), the steps involved in the CPM buying model are:

1. The advertiser approaches publishers with a request for proposal, or a publisher approaches advertisers with a rate card. In either case, this is a proposal to do business.

2. The advertiser and the publisher negotiate on the specific terms for the deal. In all media, this is a complicated process.

3. After the deal is consummated, the advertising space is used as contracted.

4. After the advertisements appear, the advertiser pays for the delivery.

The Internet has made it easier to determine the effectiveness of advertising. The possibility of directly measuring actions and associating these actions with a particular advertisement creates a powerful mechanism for aligning the interests of advertisers and publishers. Such a model would alleviate or eliminate much of the complexity associated with the CPM model.

2.3 CPA Model

Another way for advertisers to pay publishers is on a performance basis, that is, the cost per action (CPA) model. Under this model, the advertiser only pays when the advertising generates a measurable result. Today, many CPA deals measure performance by counting the click-throughs that a particular ad generates. A few services, including the system of the present invention, measure events beyond the click, such as registrations, software downloads, and sales.

Selling advertising media on a per-action basis aligns the interests of both the advertisers and the publishers. Publishers are motivated to do whatever they can to improve the effectiveness of the advertising. This type of payment works best with direct marketers who are trying to achieve some measurable response, rather than branders who are only trying to increase name recognition.

Typically (see FIG. 12), the steps involved include:

1. A publisher offers ad space to advertisers at a particular performance rate.

2. Advertisers accept the offer.

3. The ads are run, and the performance is measured.

4. Advertisers pay for the results measured.

The CPA model shifts risk from the advertiser to the publisher. If the advertising does not work, the publisher does not get paid. The conventional CPA model does little to compensate the publisher for the additional risk. The inverted CPA model, described below, addresses this issue.

SUMMARY 3.1 Inverted CPA Model

In the CPM and conventional CPA models, advertisers select from a pool of publishers competing for their ad dollars. To compensate the publisher for accepting the additional risk of CPA payment, the inverted CPA model provides publishers with a pool of advertisers to choose from, and provides publishers with further control over the advertising that is placed on their site. In the CPM model, publishers are not concerned about the particular advertisements that are placed on their site, as long as they do not contain objectionable material.

In the inverted CPA model, publishers choose which media (e.g., ads) they want to appear on their site, because they will get paid only if those ads are effective. The effectiveness of the media may be measured using CPM, CPA, CPC, and the like.

In the inverted CPA model, the present invention inverts the traditional roles of buyer and seller. In the CPM and CPA models, price negotiation begins with publishers. In the inverted CPA model, it begins with advertisers. Advertisers create offers comprised of the creative and the price they are willing to pay for any action that may result. These offers are listed on the exchange system. Publishers review these offers and select the ones that are most appropriate. Thus, the commodity that is bought and sold on the exchange system is really a promise by the advertiser to pay for the actions resulting from a publisher placing the ad on their site.

The abstract steps (shown in FIG. 12) are:

1. An advertiser offers to pay publishers at a particular performance rate.

2. Publishers accept offers.

3. The serving of the creatives occurs pursuant to specified constraints including time, volume, monetary amount and the performance is monitored.

4. The advertiser pays for the results measured. The Internet provides the environment in which these various models can co-exist and compete with each other. The competition will strengthen and reward the successful models. Multiple competing models may continue to exist, each serving their own market niche.

The method and system of the present invention introduce an exchange (like NASDAQ), coupled with a unique business model, to this chaotic market. The exchange reduces fragmentation by providing aggregation, increases efficiency by providing commoditization, and creates transparency by providing unbiased market-determined pricing. The method and system of the present invention change the current sales paradigm by inverting the traditional sales of buyers and sellers. Advertisers make offers that publishers can accept or reject. The system, based on the delivery of results flowing from the actions on the ads rather than the mere renting of the ad space, aligns the interests of both advertisers and publishers to further energize the market.

In one embodiment, the "many to many" environment of the exchange system of the present invention creates a potentially unlimited number of registered Advertisers with the ability to make potentially unlimited numbers of variable offers to compensate a potentially unlimited number of registered Publishers for actions performed as a result of media run on Publishers' sites. The Exchange environment commoditizes the buying and selling of advertising because any party involved can alter its position at any time. For example, Advertisers with accepted offers running on Publisher sites can modify the terms or withdraw the offers completely from the exchange floor at any time. Similarly, Publishers running accepted offers on their sites can remove the ads from the sites and replace them with offers from any Advertiser on the Exchange at any time. The "contracts" created are liquid in that there is no fixed duration, no fixed Publisher space that is actually acquired and no fixed price in that either party can modify price or withdraw/reject the offer. Therefore, by commoditizing the media, the method and system of the present invention allow for creation and termination of many one-toone contracts between parties in a many-to-many environment, all in real-time. The system is capable of keeping the identity of the publishers anonymous to the advertisers. Also, the identity of the publisher may be made known to the advertisers so that certain offers may be targeted to specific publishers.

Furthermore, the combination of the exchange and trading model brings hitherto non-participating players into the market. This releases hidden liquidity and increases the market several fold. Reluctant advertisers are emboldened to participate in a predictable, risk-free environment. Publishers, even tiny ones, can generate revenue from their under-utilized ad inventory without the need of a sales force. An extremely low cost of entry encourages experimentation and participation by both advertisers and publishers regardless of their size. The exchange provides feedback loops and utilizes network effects to fuel an exponential growth of transactions.

In one aspect, the system operates like a commissions exchange where the fair market value of a commission is discovered. According to this view, publishers are considered as affiliates or as a dynamic outsourced sales force for an advertiser/merchant. These affiliates or resellers are paid primarily by a commission on the sales they generate. Typical affiliate sales programs have previously been static and long term. The exchange allows the affiliate relationship to be dynamic, and hence responsive to changing conditions in real-time. Publisher/Affiliates can simultaneously have relationships with several merchants at the same time and can dynamically adjust these relationships to maximize their yield. Moreover, because the prices being paid are determined by supply and demand, the commission is not fixed and reflects the fair market value of the relationship.

In one aspect, the system operates like a commissions exchange where the fair market value of a commission is discovered. According to this view, publishers are considered as affiliates or as a dynamic outsourced sales force for a advertiser/merchant. These affiliates or resellers are paid primarily by a commission on the sales they generate. Typical affiliate sales programs have previously been static and long term. The exchange allows the affiliate relationship to be dynamic, and hence responsive to changing conditions in real-time. Publisher/Affiliates can simultaneously have relationships with several merchants at the same time and can dynamically adjust these relationships to maximize their yield. Moreover, because the prices being paid are determined by supply and demand, the commission is not fixed and reflects the fair market value of the relationship.

3.2 Inverted CPA Advertising Exchange

The system "inverts" the traditional CPM and more recently adopted CPA models (the "inverted CPA model") to "commoditize" advertising space and create a highly efficient method of business via an exchange. This section outlines how the exchange works. The idea of using an exchange to obtain a high degree of trading efficiency has already gained wide exposure on the Internet. For instance, Chemdex(TM) trades bulk chemicals, Band-X(TM) trades Internet bandwidth, FastParts(TM) trades electronic parts, and National Transportation Exchange trades available cargo space on trucks.

The invention implements a centralized exchange (see FIG. 13), preferably as a website. Advertisers and publishers join the service by first registering. Advertisers describe their demographic, psychographic, geographic, and economic requirements in an offer. Similarly, publishers describe the demographic, psychographic, and geographic parameters of each page, area, or channel of their website. As shown below, through the system advertisers are able to instantly submit for viewing by all publishers any number of offers on the exchange. Advertisers may also instantly remove offers from the exchange, even though such offers may have already been accepted by and served on publisher sites. Similarly, publishers may instantly accept and, through the system, begin serving the media on their sites, as well as instantly reject any and all previously accepted offers. The system tracks the actions performed for the advertisers for each and every offer, and resultant compensation due to the publishers for each and every offer. The advertiser can specify incentives that include distribution fees (CPM-based), click through fees (CPC-based), lead generation fees (CPL-based) and action-related fees (CPA-based). Publishers are compensated for events generated at the rate specified by the advertiser incentives. For instance, advertisers may want to sell different products, test different creative ads, or try a variety of different incentive levels. Publishers are able to review and accept those offers in real time via the exchange. As soon as an offer is accepted, the system starts serving the corresponding ad, which appears on the publisher's page(s). A single offer can be accepted by as many publishers as are registered on the exchange. This is a substantial enhancement for advertisers as it extends the reach of the ad and increases the likelihood that the media will achieve the desired actions, all without risk to the advertiser. Since advertisers only pay for results, there is little to no concern about how many or which Publishers accept the offer(s) placed on the Exchange. To the publisher, the exchange facilitates the liquidation of unsold inventory at no additional incremental cost thereby optimizing the advertising revenue yield for a website. In addition, the exchange brings potentially undiscovered advertisers (or advertisers willing to pay only via the exchange system) to publishers for no added cost. The result is an efficient liquid market on both sides. An exemplary process is depicted in FIGS. 3-9.

The inverted CPI model shifts risk and aligns the interests of all parties. Since advertisers pay only for effective advertising, their risk is—reduced and their return on investment (ROI) is predictable. The inversion brings advertisers to publishers, making an expensive publisher sales force unnecessary.

3.3 Value Proposition

The invention provides multiple benefits to both advertisers and publishers. The exchange system saves time, effort, and money for all participants. It also provides opportunities for optimization that have previously been unavailable. The exchange system also adds value for advertisers and publishers by substantially increasing their efficiency in three ways:

1. The exchange's central marketplace brings together advertisers and publishers with complementary requirements.

2. The structured commodity allows for the immediate consummation of deals, rather than a time-consuming and expensive bilateral negotiation.

3. Price discovery provides advertisers and publishers with the security that they are dealing at a fair market price.

One aspect of the present invention is a method and system providing a dynamic real-time automated exchange for buying, selling and trafficking commoditized media while providing real time performance reporting and buyer/seller optimization modules. Once a contract between an advertiser and a publisher is established, the system and method of the present invention automates the advertiser-publisher relationship by trafficking media (such as serving ad banners), tracking related activities (such as sales, leads generated or click-through), providing media or inventory performance feedback, monitoring and detection of fraud as well as the collection and distribution of commissions. This aspect also describes a web-based, business-to-business, e-commerce infomediary for the Internet advertising market.

In one embodiment of the present invention, the Internet interface devices 220a-220n typically include a central processing unit (CPU) 223 for processing and managing data; and a keyboard 224 and optionally, a mouse or a pointing device 225 for inputting data. A main memory 227 such as a Random Access Memory (RAM), a video memory 228 for storing image data, and a mass storage device 231 such as a hard disk for storing data and programs are also included in a typical personal computer (PC). Video data from the video memory 228 is displayed on the display screen 230 by the video processor 229 under the control of the CPU 223. A communication device 232, such as a modem or a wireless communication device, provides access to the Internet 221. Optionally, one or more of Internet interface devices 220a-220n may be connected to a local network 234. An Input/Output (I/O) device 226 reads data from various data sources and outputs data to various data destinations. In some embodiments of the present invention, the Internet interface devices may be simplified for cost and space purpose to omit one or more of the above components. For example, one or more of the mouse, keyboard, and disk may be omitted or combined with other components to achieve lower cost or smaller size. Servers (hosts) 222a-222m are also computers and typically have architecture similar to the architecture of Internet interface devices 220a-220n. Generally, servers differ from the Internet interface devices in that servers can handle multiple telecommunication connections at one time. Usually, servers have more storage and memory capabilities, and higher speed processors. Some servers (hosts) may actually be several computers linked together, with each handling incoming web page requests. In one embodiment, each server 222a-222m has a storage medium 236a-236m, such as a hard disk, a CD drive, and the like for loading computer software. When a software such as the software responsible for online media exchange according to the present invention is loaded on the server 222a, an off-the-shelf web management software or load balancing software may distribute the different modules of the software to different servers 222a-222m. Therefore, in one embodiment, the computer program responsible for executing the present invention resides on one or more servers.

An exemplary web site location 235 is shown on server 222a in FIG. 1. In one embodiment of the present invention, the advertisers and the publishers interact with the system by accessing web site 235 as described below in more detail. The web site 235 has a unique address that is used by the users to access server 222a (in this example) and the web site location on the server 222a. The computer software for executing the steps of the present invention may also reside on the web site 235.

DESCRIPTION OF THE DRAWINGS

For as better understanding of the nature, objects, and processes involved in this invention, reference should be made to the detailed description taken in conjunction with the accompanying drawings, in which:

FIG. 18 illustrates an example advertiser home page graphical user interface in accordance with an embodiment of this invention.

FIG. 19 illustrates an example offer management web page in accordance with an embodiment of this invention.

FIG. 20 illustrates an example offer editor web page in accordance with an embodiment of this invention.

FIG. 21 illustrates an example banner management web page in accordance with an embodiment of this invention.

FIG. 22 illustrates an example banner editor web page in accordance with an embodiment of this invention.

FIG. 23 illustrates an example URL management web page in accordance with an embodiment of this invention.

Like reference numerals refer to corresponding parts throughout the several views of the drawings.

DETAILED DESCRIPTION

Figure 1:
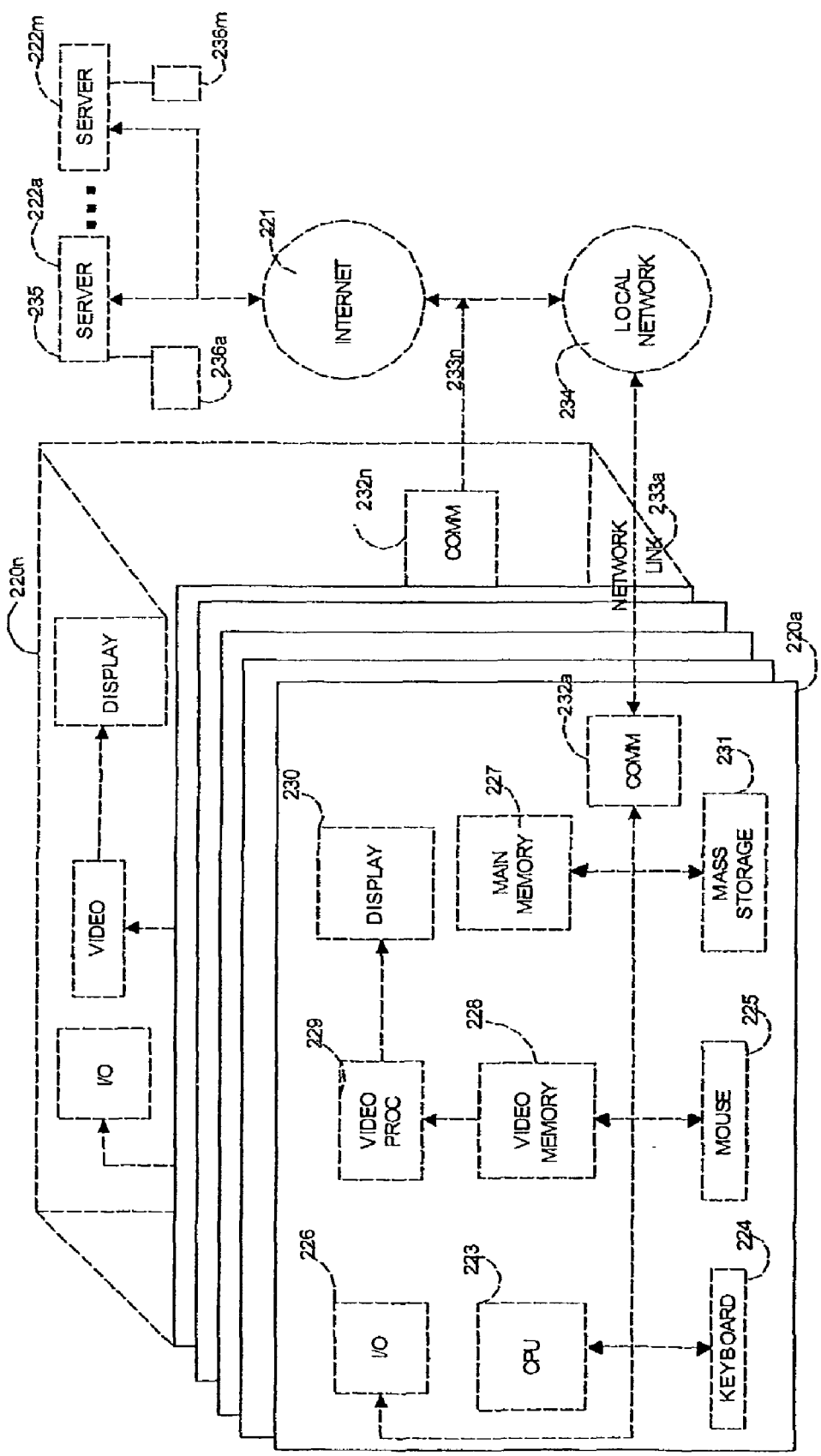
FIG. 1 illustrates a client-server computer network (e.g., the Internet) constructed in accordance with an embodiment of this invention.
Figure 2:
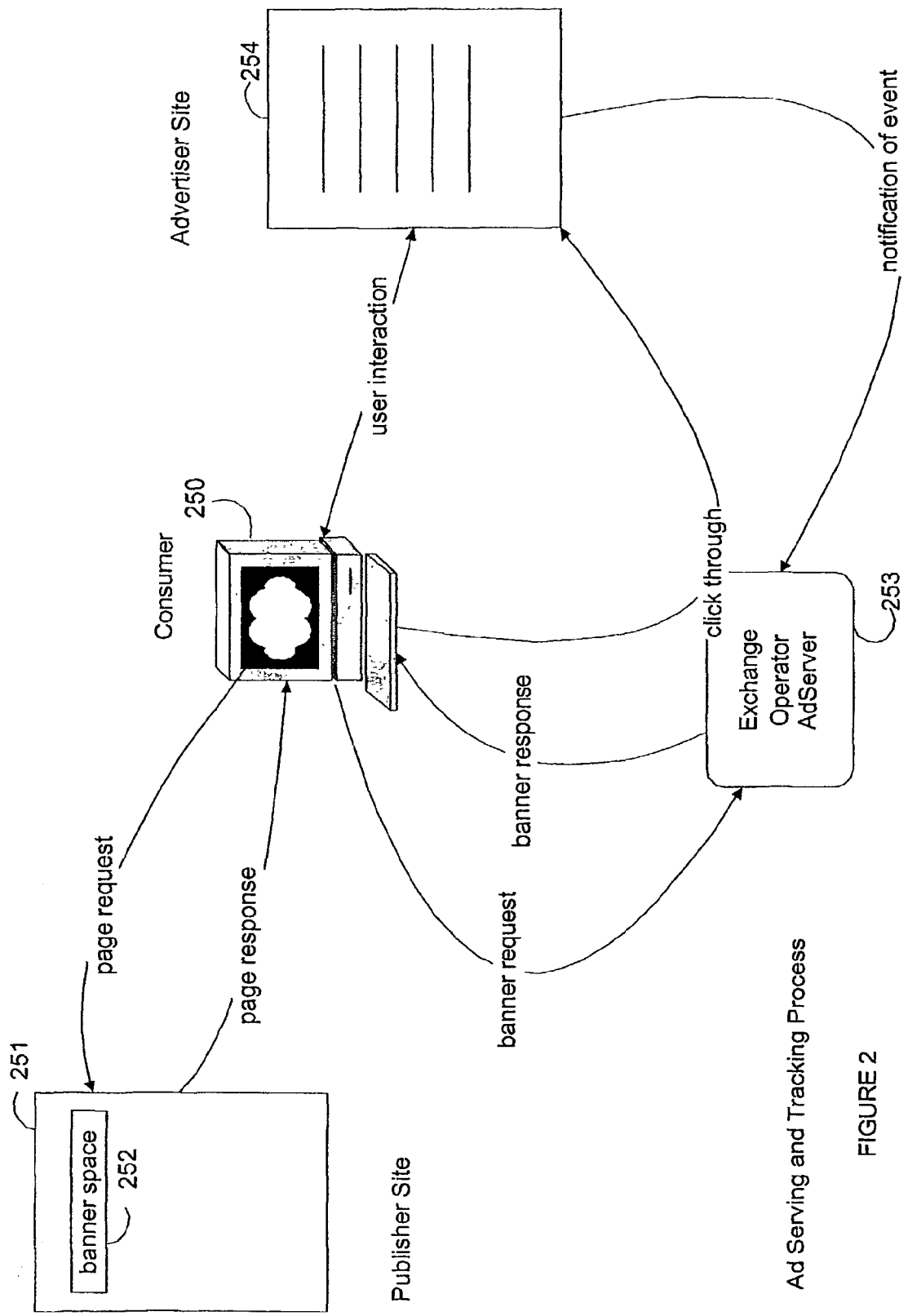
FIG. 2 illustrates an example processing operation to server and track advertisements in accordance with an embodiment of this invention.

FIG. 1 shows a block diagram of a typical Internet client/server environment used by advertisers, publishers and consumers in one embodiment of the present invention. Internet interface devices 220a-220n are connected to the Internet 221 through the communication links 233a-233n. Optionally, a local network 234 may serve as the connection between some of the Internet interface devices 220a-220n, such as the Internet interface devices 220a and the Internet 221. Servers 222a-222m are also connected to the Internet 221 through respective communication links. Servers 222a-222m include information and databases accessible by Internet interface devices 220a-220n. In one embodiment of the present invention, a computer program for online media exchange resides on at least one of the servers 222a-222m and is accessible by the advertisers and publishers using one or more of the Internet interface devices 220a-220n.

5.1 System Architecture

Figure 15:
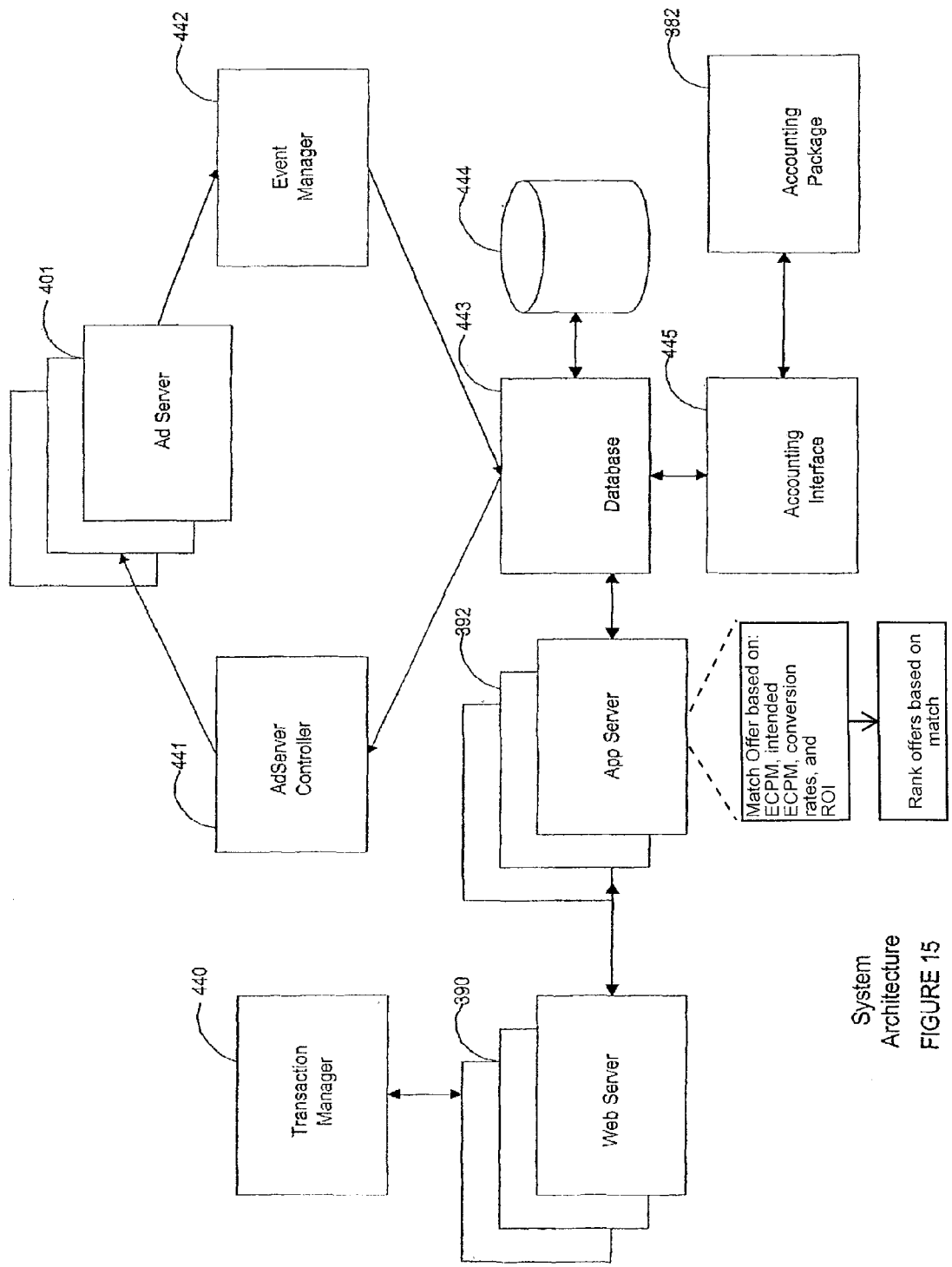
FIG. 15 illustrates a system architecture in accordance with an embodiment of this invention.

In one embodiment, the architecture of the system includes five major components: the Web server 390, the ad server 401, the application server 392, the database 443, and the accounting package 382. The architecture for one embodiment of the exchange system is set forth in greater detail below. Moreover, the architecture for another embodiment of the System is shown in FIG. 15.

5.1.1 Web Servers

Web servers 390 interact with the system users (i.e., an advertiser or publisher). The web servers 390 provide the user interface to the exchange service. It is the only component that knows about the precise details of the user interface. The Web servers 390 are generally under a light load and do not have severe real-time constraints.

5.1.2 Application Servers

The application servers 392 house all the business logic of the system. There are two primary functions of this component. The first is to provide editing and management functions for all the objects associated with the advertiser arid the publisher. The second is to provide the automation necessary to have a dynamic real-time negotiation system. This includes functions for filtering and matching the offers to the publishers. Multiple applications servers can be used within the system architecture. Some application servers 392 can be used for specific tasks (e.g., for customer support functions).

5.1.3 Database

The database 443 is the repository of all the persistent data in the System. One embodiment uses an object-oriented database for this purpose since it provides a direct mapping to the objects used in the rest of the system.

5.1.4 Ad Servers

The ad servers 401 are in charge of serving up the ads when requested by the end-user. The ad server 401 has been designed to be fast and efficient by caching all required data in random access memory. For example, if the ad server 401 were to not serve up the requested ad in a timely fashion, it would result in a broken GIF, which could detrimental to the business reputation. The ad server 401 is therefore very robust. In order to maintain real-time control over the ads being served, the invention maintains direct control over the ad server 401.

There are multiple ad servers 401 to handle the load. Each ad server 401 is independent of all the others with the ability to serve all the ads by itself. In one embodiment, hardware load balancers are used to balance the load among the ad servers 401.

The database 443 communicates with the ad servers 401 via the ad server controller 441. When there is any change in the ads, the information is passed from the database 443 to each of the ad servers 401 via the ad server controller 441. The ad server controller 441 instantaneously communicates new advertising to the ad servers 401 upon new trades taking place in the exchange.

5.1.5 Measurement

The ad server 401 is also responsible for gathering the information about various actions or events that take place related to the ad that has been served. For example, the ad server 401 is responsible for receiving all click-throughs and redirecting them to their appropriate targets. It is also responsible for receiving all notifications of sales or other actions. These events are then handed off to the log servers 442 as soon as possible. It is the responsibility of the log servers to make sure that the events are logged and then recorded in the database 443.

5.1.6 Accounting System

All the online, real-time accounting information is stored in the database 443 and reported to the customer on demand. Periodically, all this information is aggregated and sent to the accounting package 382 whose responsibility it is to keep track of what has been is billed, owed, and received. The accounting package 382 is the interface to the external world of billing.

5.2 Advertiser and Publisher

This section describes an advertiser's and a publisher's experience using one embodiment of the present invention.

Figure 3:
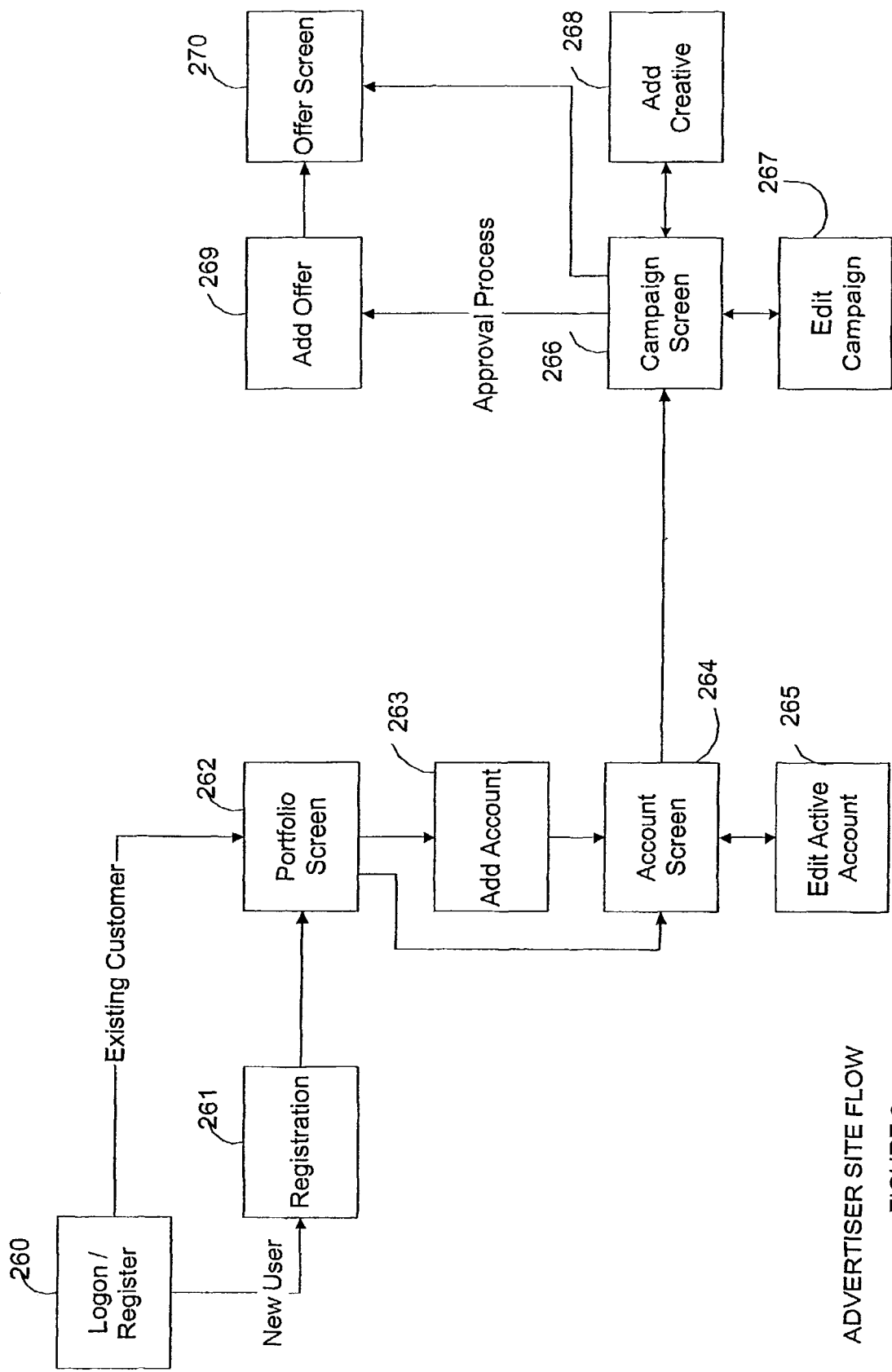
FIG. 3 illustrates an example user interface process that an advertiser executes in accordance with an embodiment of this invention.
Figure 4:
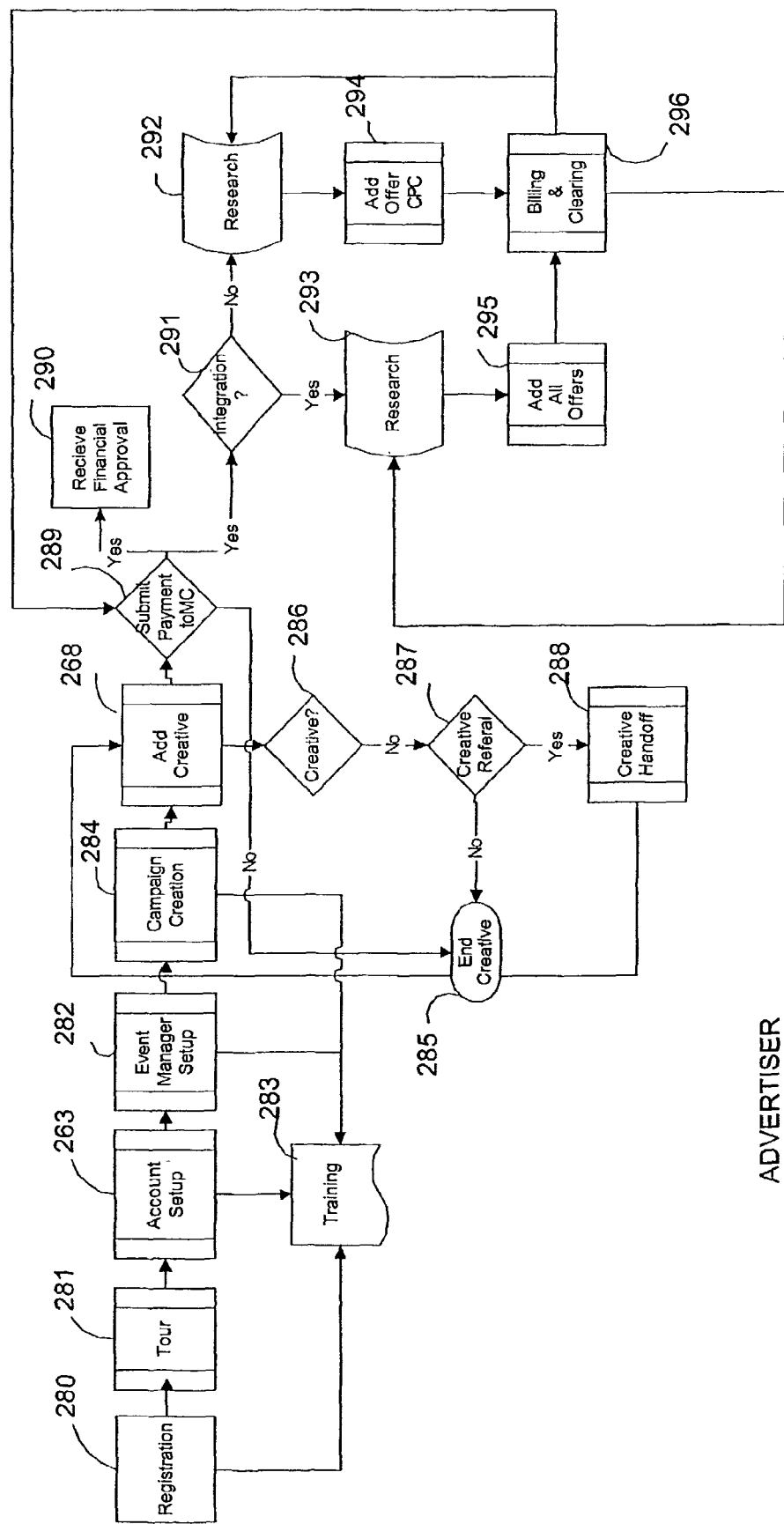
FIG. 4 illustrates an example processing operation that an advertiser executes in accordance with an embodiment of this invention.
Figure 5:
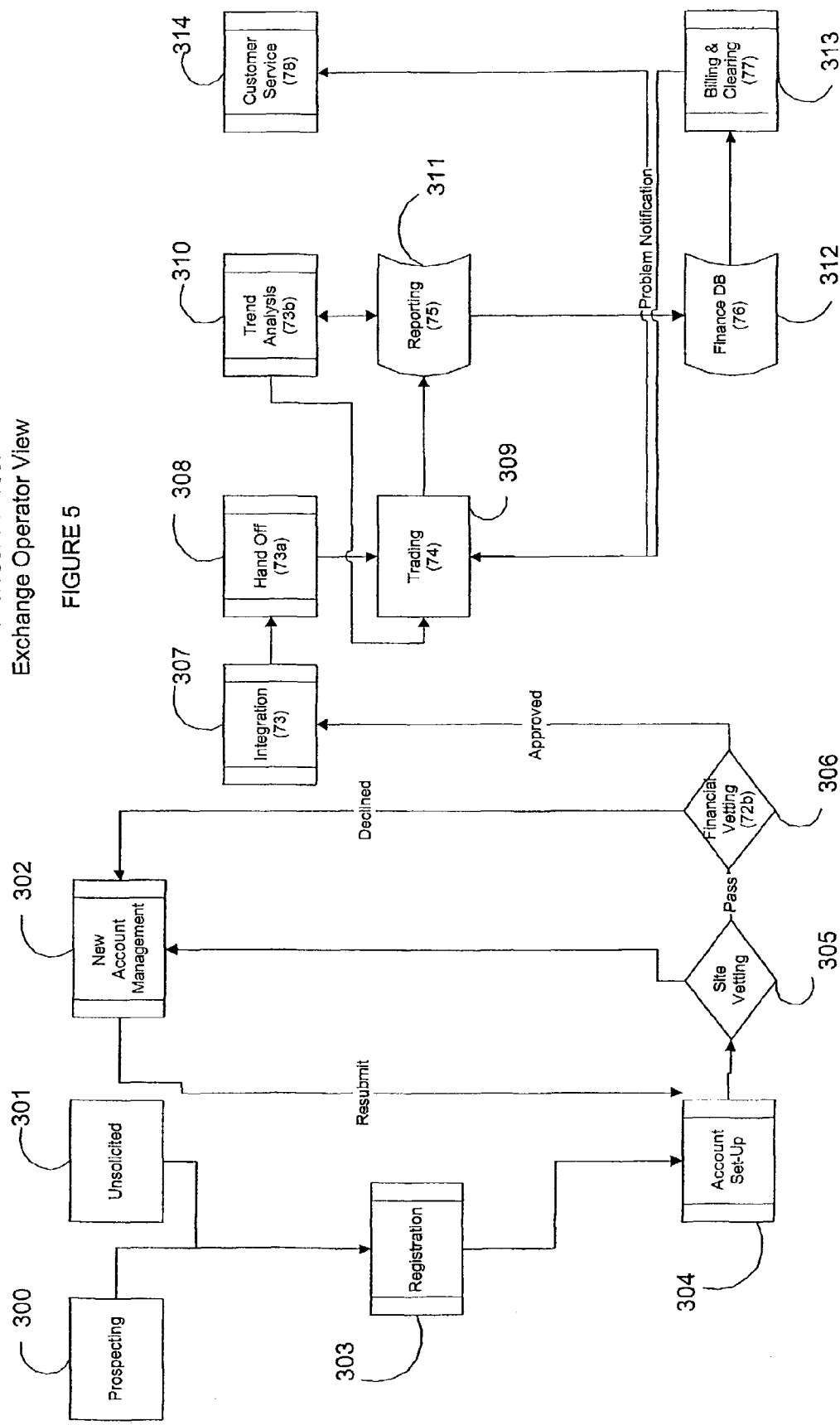
FIG. 5 illustrates a processing operation for an advertiser from the exchange operator's point of view in accordance with an embodiment of this invention.

Advertisers (see FIGS. 3-5)

1. Advertisers register 280 for access to the service and the system verifies their credit-worthiness 306.

2. Advertisers create accounts 263 to organize their campaigns.

3. Advertisers create campaigns 284. They specify the actions for which they will compensate publishers. If they pay solely for impressions and/or clicks, nothing more is necessary. If they want to pay by registrations, downloads, or sale, the system provides the tools necessary to track such actions and measure compensation due to publishers.

4. Advertisers create offers 294, 295 within a particular campaign. The parameters of an offer are described in the "Commoditization" section.

5. Advertisers monitor 411 an aggregated view of the responses from publishers. Based on the feedback, they can dynamically adjust the offer. For instance, they can modify their creative or change the incentives.

6. Advertisers monitor 412 the offers as the ads run in real time, thereby maximizing the efficiencies provided by the exchange. Unlike a static contract (e.g. binding on both publisher and advertiser for a fixed space on a web site for a set amount of time) where under-performance cannot be reversed, the exchange system utilizes instantaneous fluid contracts allowing either party to enhance performance. Either party can terminate contracts that are not achieving the desired end results.

7. Advertisers can rapidly achieve the optimal market price for advertising any given product through the exchange. For example, advertisers can start with elevated offers to compensate publishers, and then systematically reduce these amounts incrementally until the precise intersection between supply and demand (i.e. market price at any given point in time) is achieved.

8. Advertisers can also moderate the amount they are willing to offer as compensation to publishers depending on their own production inventory levels. For example, an advertiser with excess production capacity or aging inventory may decide to increase the incentive for compensation (thereby increasing the cost of goods sold and lowering margins) to publishers to increase the reach to accelerate sales. Conversely, advertisers having difficulty keeping up with demand may elect to reduce incentives on offers to publishers in order to reduce reach and corresponding sales volume.

Figure 9:
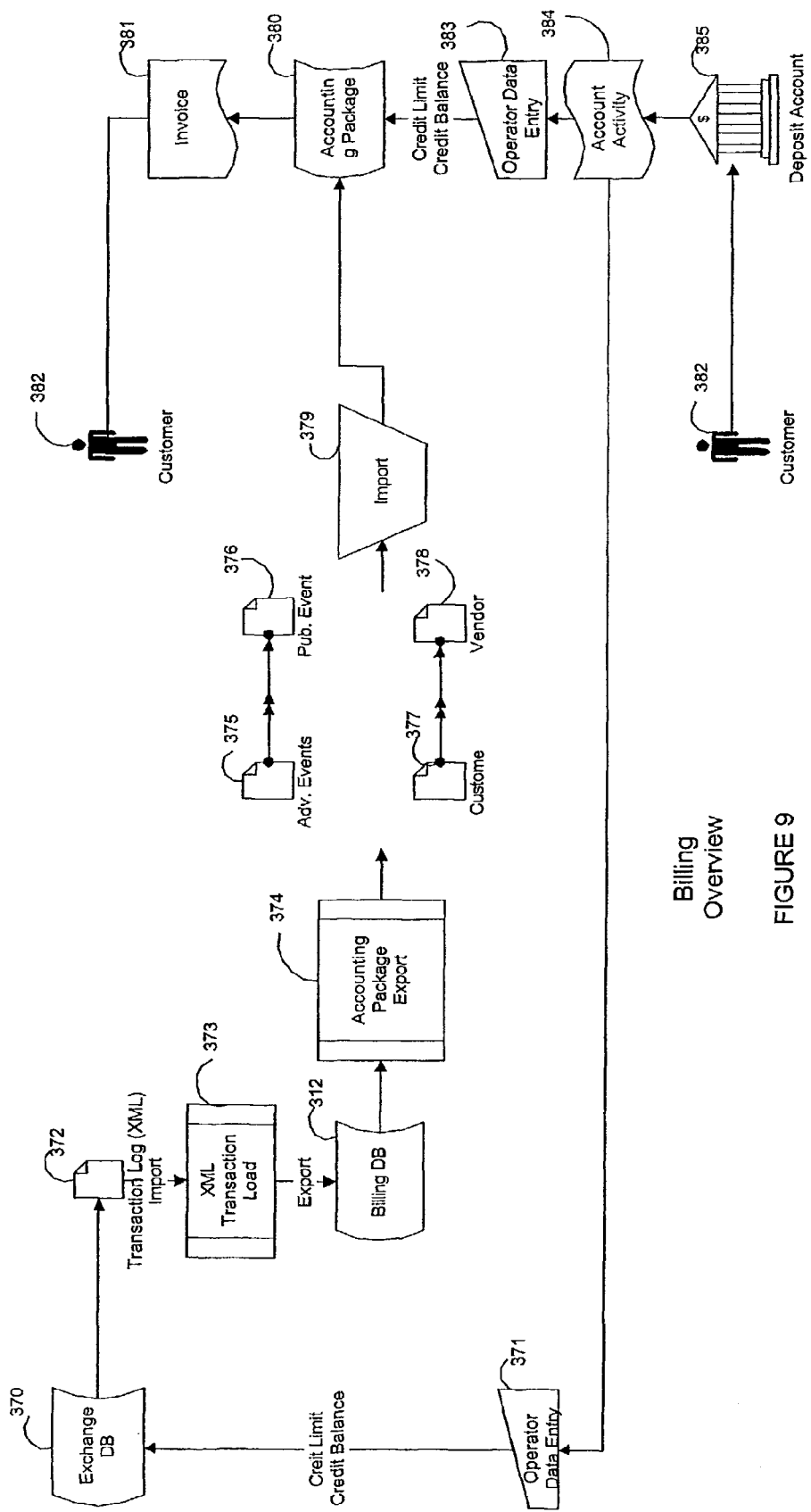
FIG. 9 illustrates a processing operation for billing and accounting in accordance with an embodiment of this invention.
Figure 10:
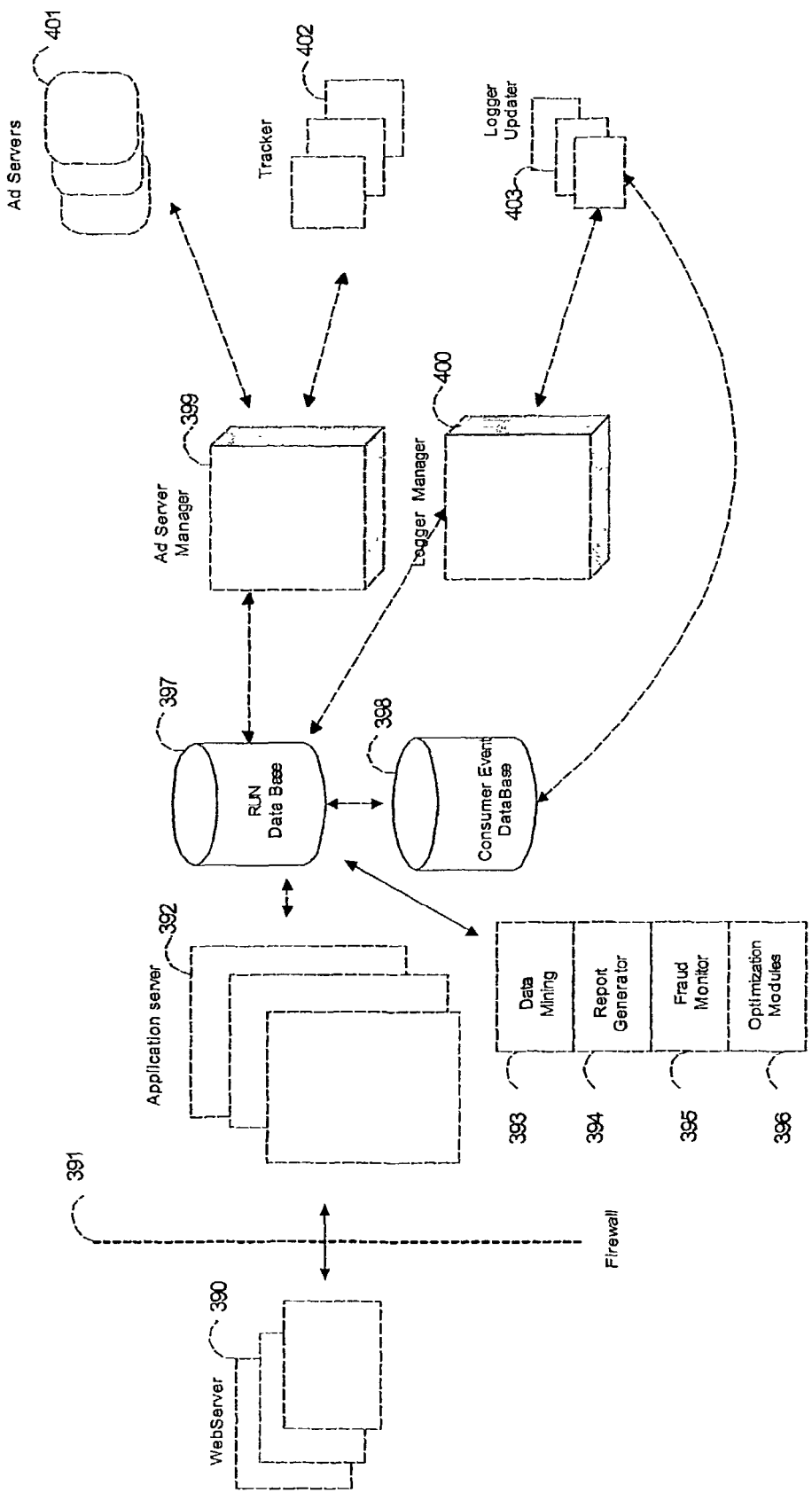
FIG. 10 illustrates an example system architecture which may be used in accordance with an embodiment of this invention.
Figure 11:
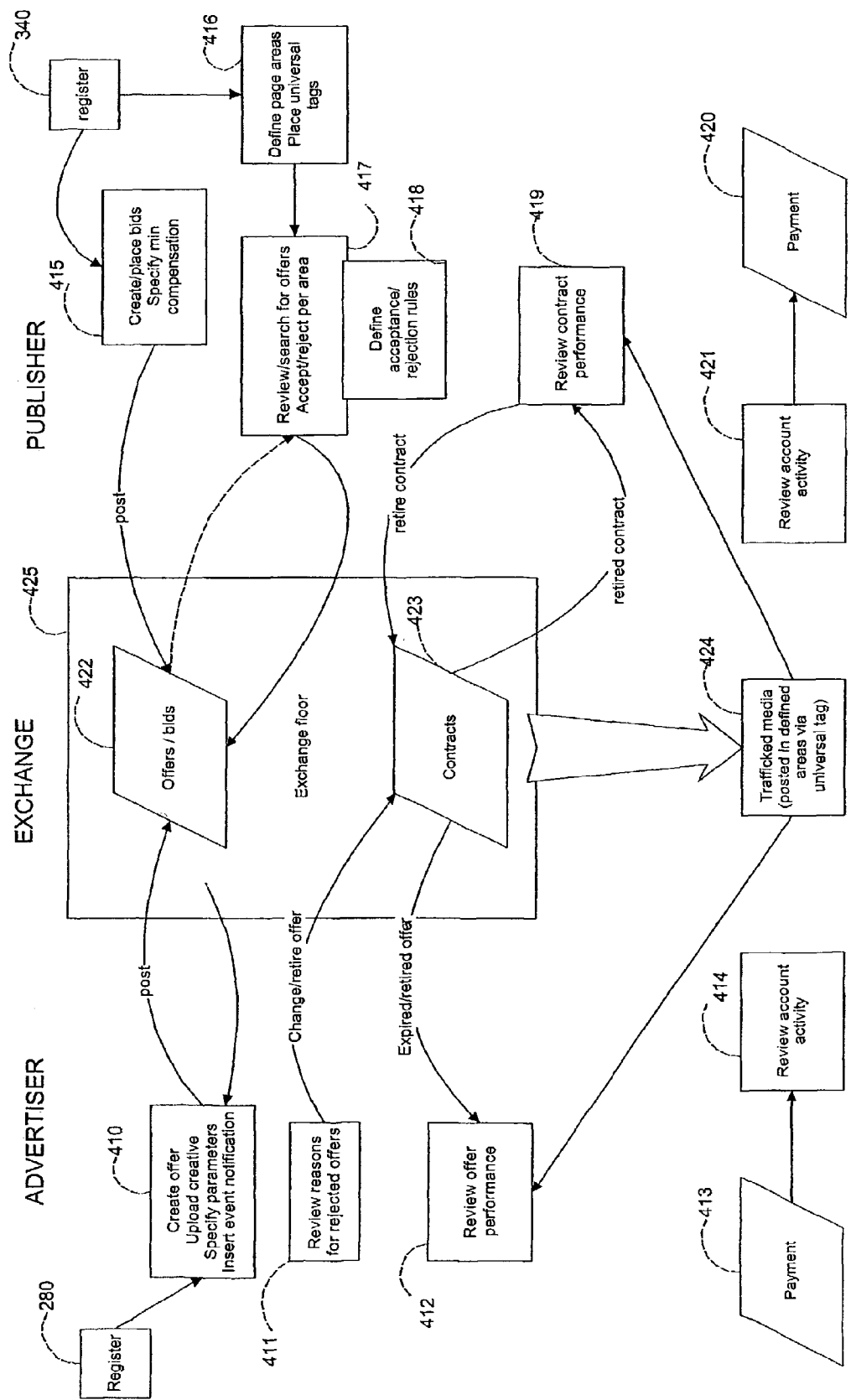
FIG. 11 illustrates processing operations undertaken by advertisers, publishers, and the exchange operator in accordance with an embodiment of this invention.
Figure 12:
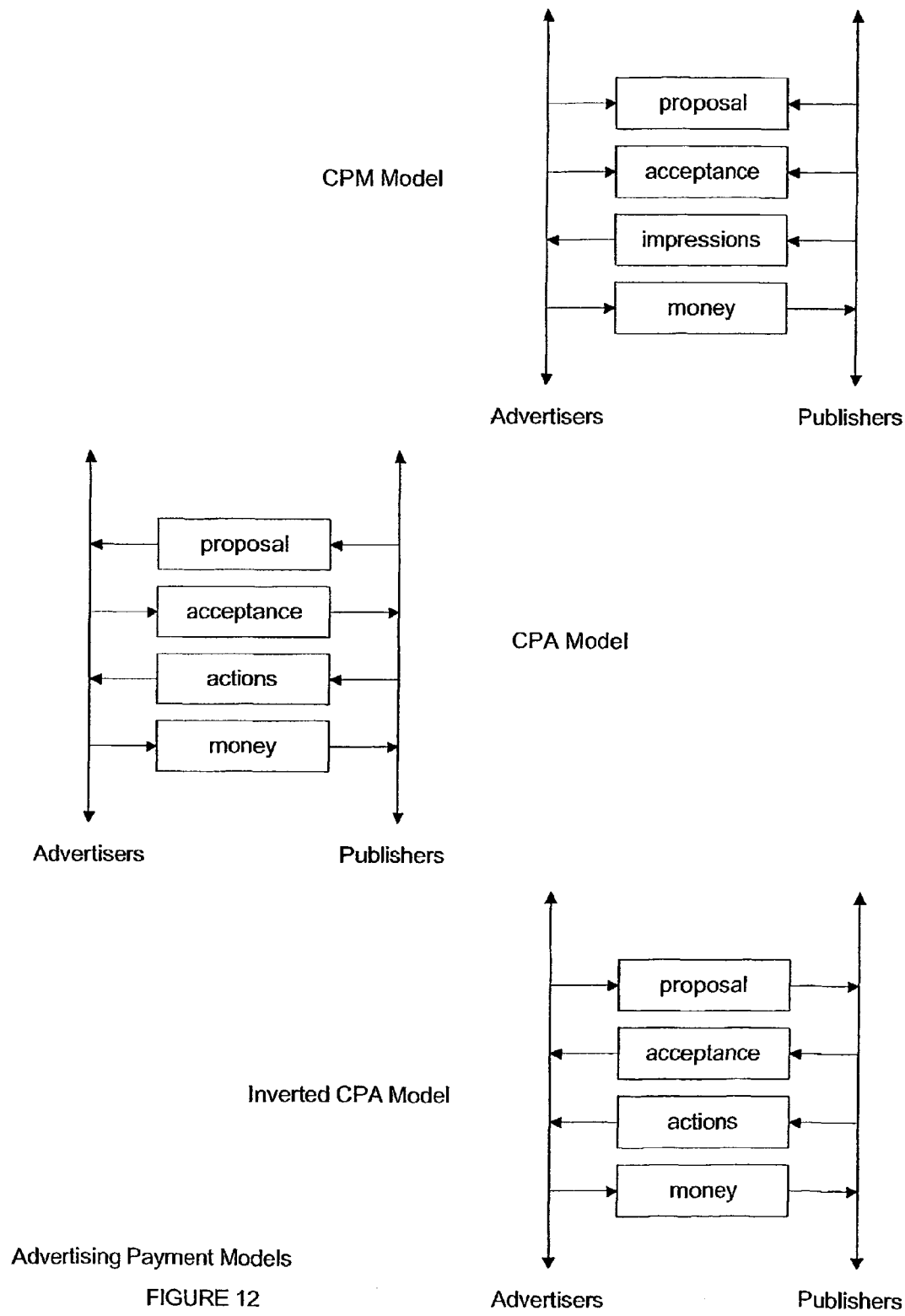
FIG. 12 illustrates several advertising negotiation and payment models in accordance with an embodiment of this invention.
Figure 13:
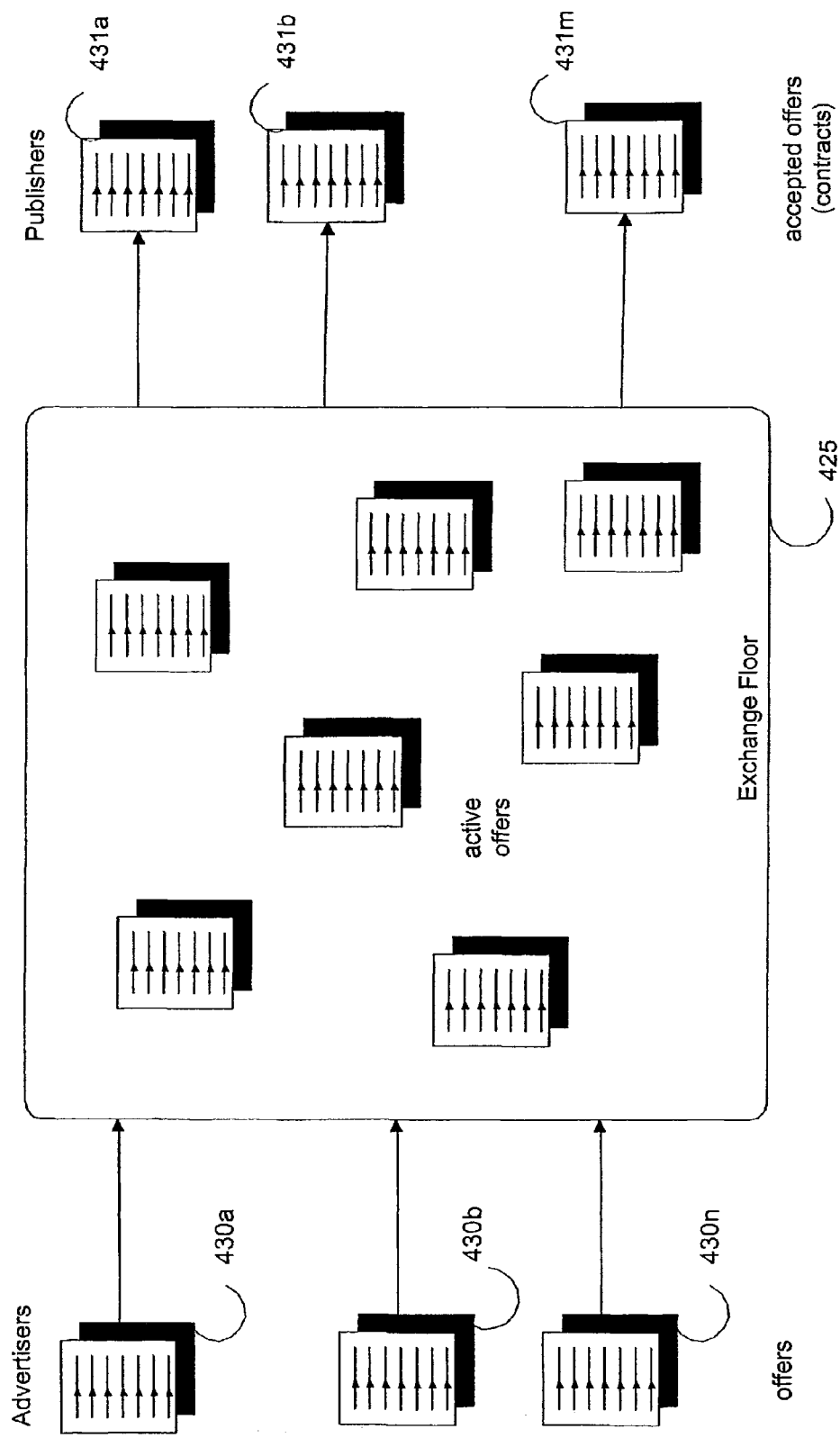
FIG. 13 illustrates a processing operation for a many-to-many exchange in accordance with an embodiment of this invention.

At the end of each month, advertisers receive a bill for the actions that their ads have generated. Advertisers pay their bill. An exemplary billing process is depicted in FIG. 9.

Figure 6:
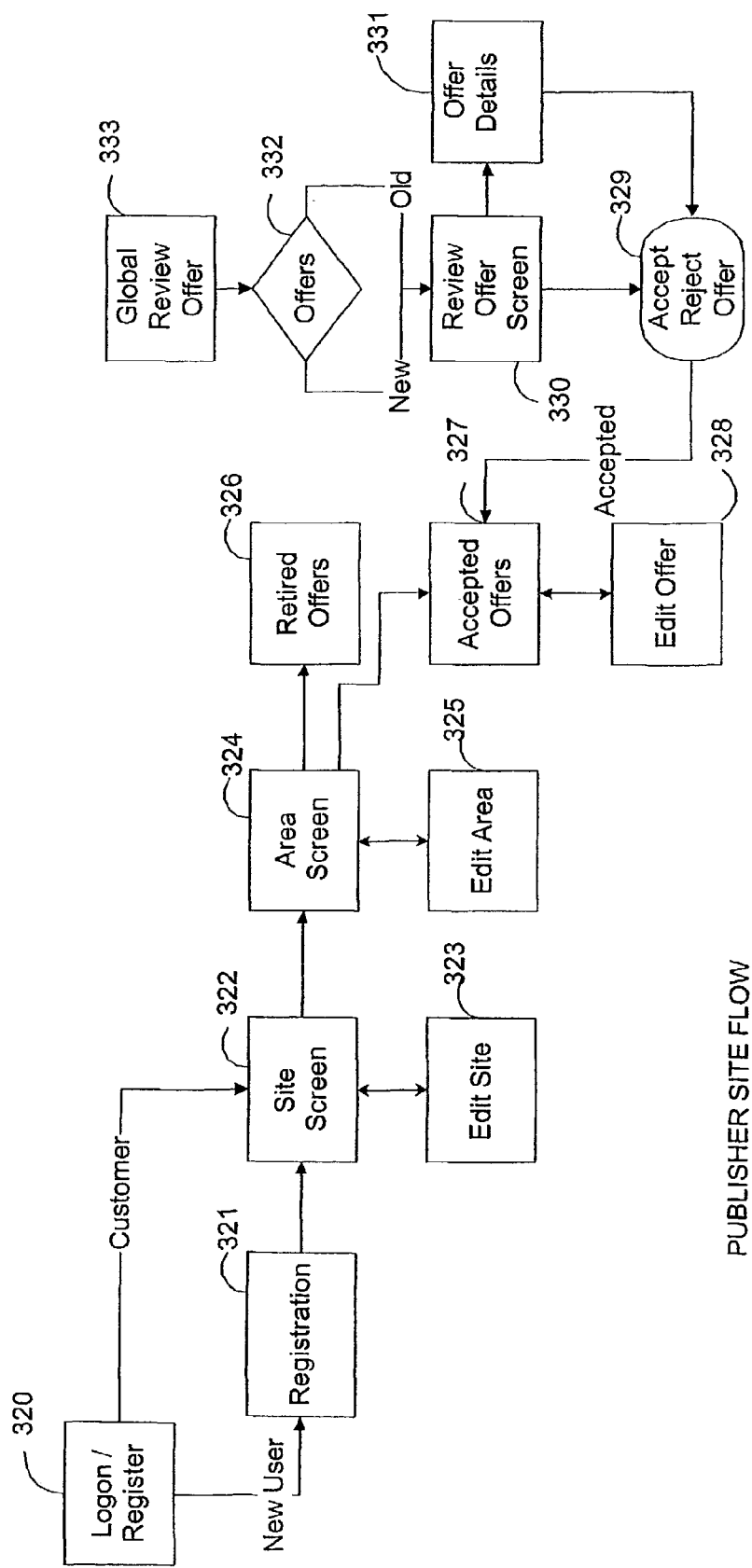
FIG. 6 illustrates an example user interface process that a publisher executes in accordance with an embodiment of this invention.
Figure 7:
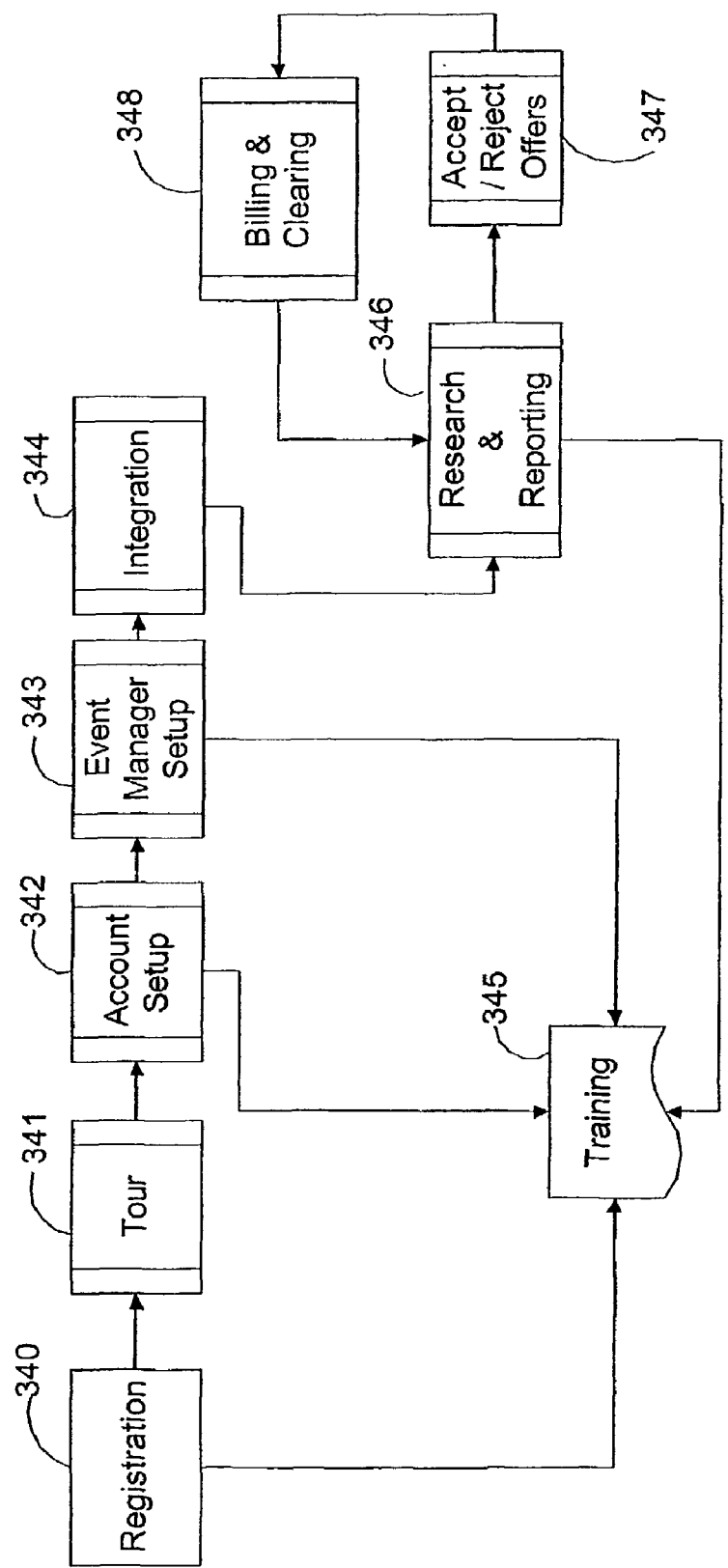
FIG. 7 illustrates an example processing operation that a publisher executes in accordance with an embodiment of this invention.
Figure 8:
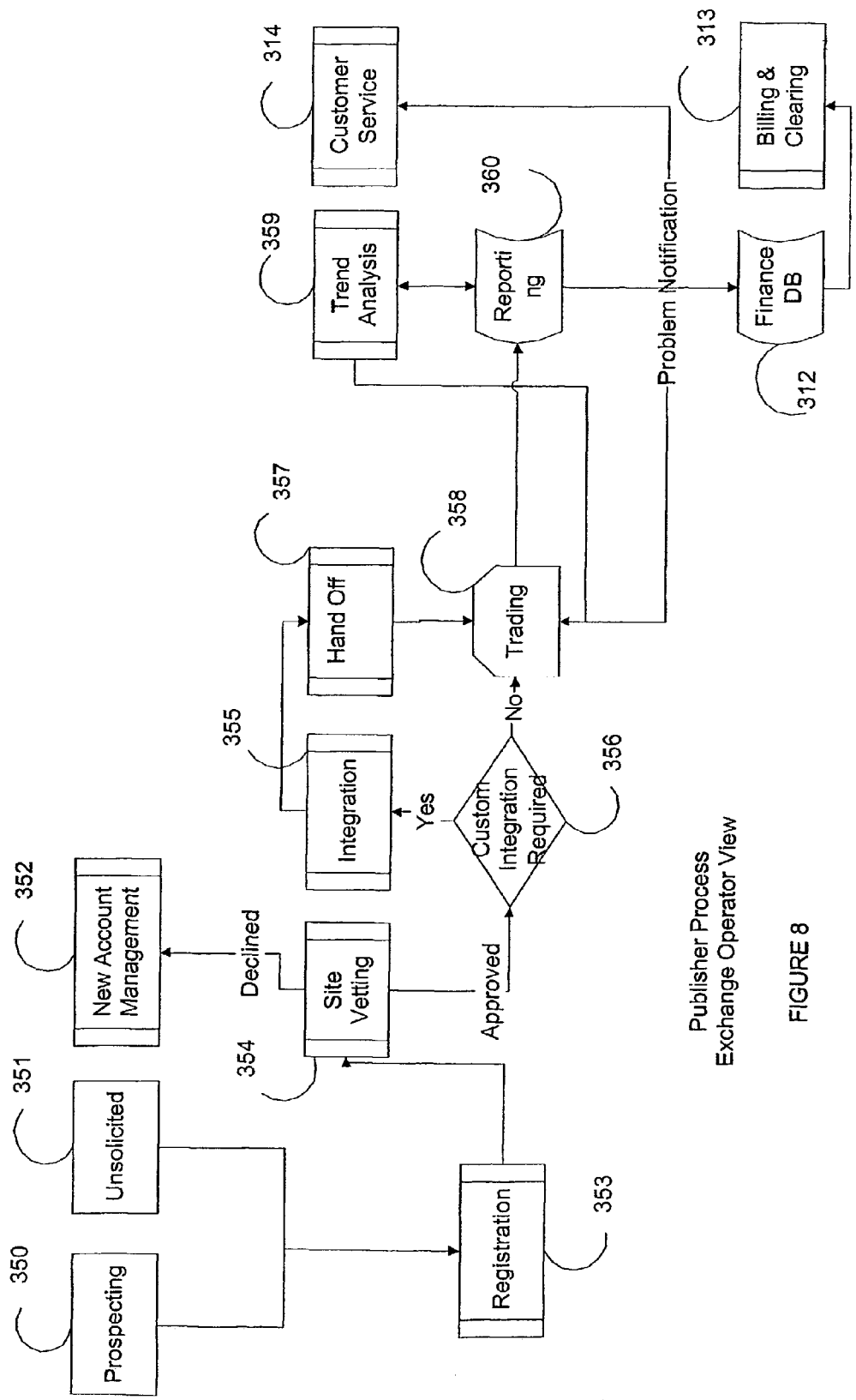
FIG. 8 illustrates a processing operation for a publisher from the exchange operator's point of view in accordance with an embodiment of this invention.

Publishers (see FIGS. 6-8) Procedures followed by and/or features and benefits offered to publisher by the system include:

1. Publishers register 340 for access to the service.
2. Publishers input 342 into the system detailed psychographic, demographic and geographic profiles, and content taxonomy of each page, area and/or channel of their web site. This information is for use in matching (through an indexing process) the most compatible advertisers from a revenue-generating standpoint.
3. In one embodiment a manual process 334 with automated support verifies that the site does not contain questionable or potentially offensive content.
4. Publishers create areas 324 to represent different parts of their site that they have integrated 344, 416 with the exchange.
5. Publishers specify preferences 415 for the kinds of advertising that they want to host. One embodiment includes publisher specified restrictions on:
   5.1. creative properties, such as their dimensions, size in bytes, and whether or not they can be animated.
   5.2. minimum acceptable incentive level.
   5.3. minimum Effective CPM ("ECPM") based on all active accepted
   5.4 offers running on the exchange.
   5.5. minimum expected flight time (the dates that the advertising campaign will run).
   5.6. modification to the offer, such as changes in flight time, creative, match indices
6. Publishers can specify how they want to handle the advertisers' offers that meet their filtering criteria 418. They can specify trading rules to automate actions that they want performed when certain criteria are met. For example the publisher can:
   6.1. Automatically 415 accept all offers that meet their criteria. For instance, if the publisher has been sufficiently satisfied with an advertiser in the past, the publisher can instruct the system to accept all future offers from that advertiser that meet specific restrictions. In this way offers can be automatically accepted in an unattended mode.
   6.2. Manually 417 review the offers that meet their criteria. As the creative and product offering are difficult to characterize, this option allows the publisher to obtain more information about an offer before deciding whether to accept or reject it.
7. Accept an offer with conditions 418. For instance, the publisher may indicate that the offer is accepted unless the advertiser changes the creative, product offer, or incentives. If the advertiser should change one of these parameters unacceptably, the publisher will automatically stop accepting the offer. In this way offers can be automatically rejected in an unattended mode.
8. Provide feedback 329 to the advertiser on accepted or rejected offers. For instance, a publisher may reject an offer but communicate to the advertiser that the offer would have been accepted if the creative were different or the incentives were higher.
9. Reject the offer with no specified cause 329.
10. Select the system's automated process of accepting and/or rejecting offers submitted to the exchange through dynamic configurable business rule definition 415 and/or parameter selection.

One embodiment of the audience/content match index method produces a number between 0 and 100 indicating the degree of the match between the advertiser's requested target and the publisher's available media, with larger numbers indicating better matches.

Once an offer is accepted by a publisher, the corresponding creative is immediately sent to and automatically served by the system's ad servers 401. Publishers may manually or automatically adjust parameters dynamically to bias the selection of advertisements (e.g. give ads different priorities with a system of weights, incorporate frequency capping, preferentially show certain ads at certain times of day).

If the selection of an advertisement (offer) fails to yield a result, there was no appropriate ad that the system could select. In that case, the system allows the publisher to specify alternative strategies. One strategy might be for the system to choose among a set of publisher-specified creatives. Another strategy might be for the system to choose among a pool of exchange-maintained creatives. These could be used to implement a banner barter service. Yet another strategy might be for the system to redirect to a publisher-specified third-party ad server.

Publishers review ads (contracts) 419 as they are running. They can manually or automatically drop ads that are not performing well (i.e. low ECPM). Alternately, they can specify minimum performance criteria, and the system will automatically drop ads that do not meet the specified criteria. In one aspect, the publishers are paid by exchange provider for the actions directly attributable to ads they have served. In one embodiment, the ECPM is defined as a method of representing cost performance of media across advertiser, channel, or globally.

5.3 Advertiser Integration

Advertiser integration is used to measure compensatable events. An important property of said integration is that it functions with any and all existing or future publishers that the advertiser may trade with on the exchange. This implies that advertisers need integrate only once with the exchange to report the delivery of compensatable events.

Advertisers can define arbitrary types of compensatable events as long as they can detect the occurrence of said event and provide notification to the ad servers 401. One embodiment of the above method is to embed a 1×1 transparent pixel in the "thank you" page of the advertiser that communicates the event (e.g. lead, download, sale) to the ad server 401. For example, after the end-user buys an item on the advertiser's site, they are shown a "thank you" page that informs them about their purchase. The viewing of that page causes the 1×1 transparent pixel to be fetched from the ad server 401, thus notifying the ad server 401 of the sale. Strategies are used in conjunction with proprietary technology to reduce the potential of fraud in the system.

Another embodiment is to install a software module on the advertiser's network that communicates events directly to ad servers 401. A skilled practitioner would immediately recognize that such communication may be encrypted and authenticated for increased security. A skilled practitioner would further recognize that standard techniques could be employed to enable guaranteed delivery of messages on this communication link.

Another embodiment is to use a proxy HTTP server to rewrite HTML tags to allow the tracking of activity on a advertiser's site without requiring any modifications to that site.

The requirements for the advertiser integration include:

1. An advertiser should only need to integrate once for each kind of action they need to report. They should not have to re-integrate for each publisher that they work with.

2. The solution should work on a static web page.

3. The solution should be able to track repeated actions from the same customer to enable the exchange to compensate the publishers in the form of residuals over of the lifetime of the customer.

In order to discuss the solution, more context about the problem is needed. There are four distinct entities involved in delivering ads and measuring actions.

1. The exchange operator that does the ad serving and records measured actions.

2. The publisher (sometimes known as the Content Provider) that delivers content containing ads. Each ad the publisher serves has a contract id that uniquely identifies the agreement between the advertiser and the publisher.

3. The advertiser that places ads to drive traffic to their own site where they detect and report events observed to the exchange operator.

4. The consumer that uses a browser 250 to visit publisher sites, click on ads to visit advertiser sites, and generate actions that the advertiser detects and reports.

One embodiment of the solution uses the following steps:

1. The consumer visits the publisher, sees an ad, and clicks on the ad. This directs their browser to the exchange operator's ad server 401 using a request that identifies the publisher and ad.

2. The exchange operator's ad server 401 records the click, redirects the consumer's browser to the advertiser's site based on the unique identifier in the original request. The ad server 401 also defines a "cookie" on the browser that binds the advertiser's identifier to the contract id for this ad served by the publisher.

3. The consumer navigates through the advertiser site. Upon generating an action, the advertiser embeds a request for an invisible pixel on the page next sent to the consumer (e.g. the thank you page for registering). The request for the invisible pixel directs the browser to get the image data from the exchange operator's server. The request contains specific information about the action performed by the consumer.

4. The exchange operator's ad server 401 receives the request for the invisible pixel, along with the consumer's browser cookie binding the advertiser's id to the appropriate contract id. If the binding does not exist, this may simply indicate that the event was generated from a consumer that did not follow an ad to the site. The exchange operator's system records the action on the appropriate contract. The ad server 401 sets another cookie with an event signature to prevent multiple requests for the image from causing double counting of events (multiple requests for the image can occur from browser refresh, back button, printer functions, etc.). A timeout on the signature allows residual payments to occur.

The information that the advertiser includes in the request includes:

1. The advertiser id.

2. The event id (e.g. lead, download, sale).

3. In the case of a sale, there is additional information regarding the value of a sale so that advertisers may compensate publishers by a percentage of the value of the sale.

4. A string provided by the advertiser that is not directly used by the exchange operator (it is treated as opaque data) but can be useful in an audit. For instance, an advertiser may include an order id for a sale.

Since none of this information is particular to a publisher, the integration, is independent of the publishers that the advertiser is working with. All the events can be generated by a request on a static page. Signatures and timeouts control counting for residual payments to publisher. Therefore, this solution satisfies the three requirements presented at the beginning of this section.

5.4 Publisher Integration

Publisher integration is used to enable the selection and delivery of advertising creative to the media content consumer. An important property of said integration is that it functions with any and all existing or future advertisers that the publisher may trade with on the exchange. This integration must allow the publisher to communicate sufficient information to the ad server 401 in order to effectively select an appropriate offer. Furthermore, the integration may be independent of the creative media type and format that will be delivered (e.g. images, streaming media). The integration may also be independent of the creative media used to deliver publisher content (e.g. web, email, wireless).

This onetime integration may allow the delivery and measurement of impressions and clicks from network nodes other than the exchange ad servers 401. This is achieved by redirecting the request for the creative to the selected network node.

The redirection is based on a combination of parameters such as: network topology, current bandwidth amount and costs at the various nodes, and publisher or advertiser preference. Said network node may be under the administrative control of the advertiser, the publisher, or a third party.

One embodiment of this integration utilizes a Combination of HTML IFRAME tags and JavaScript. In this embodiment, if the consumer's browser supports the IFRAME tag, said tag is used. If said browser does not support IFRAME tags, but does support JavaScript, JavaScript is used to insert the HTML into the web page at the desired location. If said browser does not support JavaScript, a default creative is selected for display.

Publishers need to integrate in order to present advertising to their content readers. The constraints for the solution are:

1. A publisher should only need to integrate once for each page/area they wish to present advertising in. A publisher can use the same tags for all their pages if they don't need to partition their site into sub-areas or pages into subparts for separate measurement.

2. The solution should work with a large segment of installed browsers (Internet Explorer and Netscape Navigator).

3. The solution must allow banners to "rotate," meaning that each time a page is viewed, the banner can change.

When requesting a banner from the ad server 401, a specific publisher will include their publisher id "pubid", area id "areaid", and the desired creative dimensions "<dimension>". The identifiers are not of any particular form and need not be in the order used in the following examples.

Fundamentally, we wish HTML had a tag that looked like:

```
<ad src= http://<host>/<pubid>/<areaid>/<dimension>">
```

This would return a response containing the creative data, such as the bytes representing an animated GIF file, and a header directive indicating what should happen if the user were to click on the creative. Unfortunately, HTML does not have any such tag. Normally, in HTML when we wish to display an image that may be clicked on, a construct like the following is used:

```
<a href="..."><img src="..."></a>
```

This directs the browser to display an image within an "anchor" tag which directs where the browser should go if the image is clicked on. Unfortunately, if the img tag returns a "rotating" banner, then the destination in the anchor would have to match. There is no direct way to make this happen. Therefore, we need a construct that will generate or fetch this image/anchor pair, or else we need to use some scheme that will keep the required binding of image/anchor pair using some combination of browser and server memory. The latter is expensive and has many known problems with the solutions uncovered thus far.

We chose to use a technique to fetch the desired tags from the server. Once again, it is unfortunate that the browsers do not adhere to a standard way to do this. For Internet Explorer, we use an IFRAME, but for Netscape Navigator, we must resort to JavaScript. Both techniques effectively work like an "include directive" specifying that the HTML in include comes from a remote server. For a browser that does not support these techniques we use a "noscript" tag. Using these techniques, the idealized solution looks like:

```
<IFRAME src="http://<host>/laver/<pubid>/<areaId>/
<dimension>">
<SCRIPT language=javascript
src="http://<host>/laver/<pubid>/<areaid>/<dimension>">
</SCRIPT>
<NOSCRIPT></NOSCRIPT>
</IFRAME>
```

Unfortunately, although Internet Explorer should ignore tags between an "<IFRAME> . . . </IFRAME>" pair, it does not in this case. It makes the request to the server but does nothing with the result. This pointlessly increases the load on the ad servers 401. Therefore, we use a technique of using JavaScript to generate the desired JavaScript. This makes all browsers do more work but the end result is that Internet Explorer stops contacting the ad servers 401 while Netscape Navigator continues to do so.

There are other parameters that are included in the "IFRAME" tag to make the result look correct. These include "marginwidth", "marginheight", "width", "height", "frameborder", and "scrolling". We also try to make use of the "NOSCRIPT" section to allow the server to use is various techniques for delivering a non-rotating ad to browsers that do not support "IFRAME" or JavaScript. In one embodiment, this is the final result:

```
<IFRAME src=http://<host>/layer/<pubid>/<areaid>/<dimension>
marginwidth="0" marginheight="0" width="468" height="60"
frameborder="0" scrolling="no">
<SCRIPT language=javascript> document.write('<SCR\IPT>
language=javascript src=
"http://<host>/layer/<pubid>/<areaid>/<dimension>">
</SCR\IPT>');</SCRIPT>
<NOSCRIPT>
<a href=
"http://<host>/noscriptClick/<pubid>/<areaid>/<dimension>">
<img src=
```

This solution satisfies the three requirements defined it the beginning of this section.

5.5 Dynamic Trading

All of the system's trading is dynamic and real-time. The exchange system provides real-time reporting to both the advertisers and the publishers. Advertisers monitor each of their offers in real-time and get immediate feedback on any changes that they make. Publishers monitor the yield of the various areas on their site and get immediate feedback on changes. Previously, advertisers and publishers had to wait for up to a week to get any reports and could not readily associate changes in results with any changes they may have made. The real-time reports from the system allow advertisers and publishers to respond effectively to changed circumstances. This helps to cut losses in losing situations and increase gains in winning situations.

The ability to monitor the results immediately and change parameters dynamically allows on the fly testing of advertising. The effect of changes, such as different creatives, different product offers, and different incentives, can by tested and measured efficiently. Ultimately, the instant monitoring and dynamic controls blur the line between ad testing and full ad runs: they are both the same.

The dynamic nature of the trading allows for automated testing of variables impacting the effectiveness of advertising. One example of such a test would be an advertiser specifying three different creatives, three different product price points, and three different incentive levels. The resulting twenty-seven individual offers may be automatically generated and run for comparison.

Advertisers dynamically control their risk profile by adjusting their incentives (e.g. shifting payment from impression to sale decreases risk). Publishers can control risk by adjusting acceptance and rejection criteria for offers.

5.6 Commoditization

Commoditizing a product is a key ingredient for an efficient transactional exchange. A commodity can be described by a common set of parameters. If the values of these parameters alone is sufficient for a buy/sell decision, then the product has been fully commoditized. If a product is only partially commoditized, buyers and sellers can be matched efficiently, but a trade cannot be consummated creating an informational, rather than a transactional, exchange. A fully commoditized product permits efficient matching and trading. If the matching can be fully automated, a trade may occur as soon as a bid is submitted.

The inverted CPA model increases the commodization and fungibility to such a degree that trades can execute immediately on a transactional exchange. The commodity is represented by an advertiser's offer. One embodiment of such a commoditized offer includes:

| Parameter | Example Value |
|---|---|
| Creative | A GIF or JPEG image (the banner ad itself) |
| Product Offer | Download of Adobe Software |
| Flight time | Jun. 1 to Aug. 31, 1999 |
| Max Pay-out Compensation | $15,000 |
| Per click | $0.05 |
| Per download | $1.00 |
| Publisher Content | Computers/Software |

The advertisers may set a maximum pay-out associated with a particular offer. When the maximum dollar amount is reached, the ad is automatically pulled so that it will no longer appear on any publishers' sites.

Advertisers and publishers control the scope of potential trades by specifying inclusion and exclusion lists. These lists indicate which parties may or may not participate in this trade. One embodiment of these lists uses domain names and/or target profiles to specify the contra-parties. These lists can be manipulated to change the relationships between advertiser and publisher. In one extreme, they can be used to limit a trade to a one-to-one relationship.

By allowing trades to execute immediately, commoditization eliminates the time and energy wasted on lengthy bilateral negotiations. Allowing ads to be withdrawn instantly once an advertising budget is exhausted promotes efficiencies to the Publisher. Through the exchange system, Publishers can now offer unsold/unused space to the population of advertisers on the Exchange. Under the CPM model, website space is purchased for a fixed period of time, regardless of whether the campaign is effective and/or the advertiser has achieved the desired end result.

5.7 Reporting

All the data from the ad servers 401 is collected, summarized, and analyzed to provide a wide variety of reports available to advertisers and publishers. These reports provide transparency to the activity on the exchange allowing the participants to make informed decisions. Users can also download raw data with which to generate their own reports.

The reporting system 394 uses the collected information for data mining. This process computes useful statistics (e.g. conversion ratios, effective cost per event, activity) over various views of the system (e.g. advertisers, publishers, areas, offers, channels, or the entire exchange), aggregated over several temporal granularities (e.g. day, week, month to date).

A specific metric, ECPM, is defined as the value of an entity per thousand impressions delivered (e.g. the ECPM of an offer is the dollars spent divided by thousands of impressions delivered). This varies based on events measured and incentive levels. Two variants of ECPM are computed: past and future. Past ECPM is based on observed activity in terms of compensation levels and processed events. In one embodiment, future ECPM is computed based on processed events which provide historical conversion ratios and current incentive levels.

ECPM is used to provide a single metric for comparing similar offers with different incentive levels in the exchange.

5.8 Dynamic Control and Price Discovery

A feature of the present invention allows both the advertisers and the publishers to have complete, continuous, and rapid control over all aspects of the buy/sell process. All accepted offers are monitored continuously by the system, and the results are dynamically updated. The raw data includes impressions served and events recorded. Other useful data, such as conversion ratios and ECPM are derived from the raw data. In one embodiment, the conversion ratio is defined as the ratio of the number of actions performed to the number of impressions served to generate said actions. The system allows for different definitions of the conversion ratio. This performance data can be used by both advertisers and publishers to evaluate the performance of the accepted offer.

Figure 14:
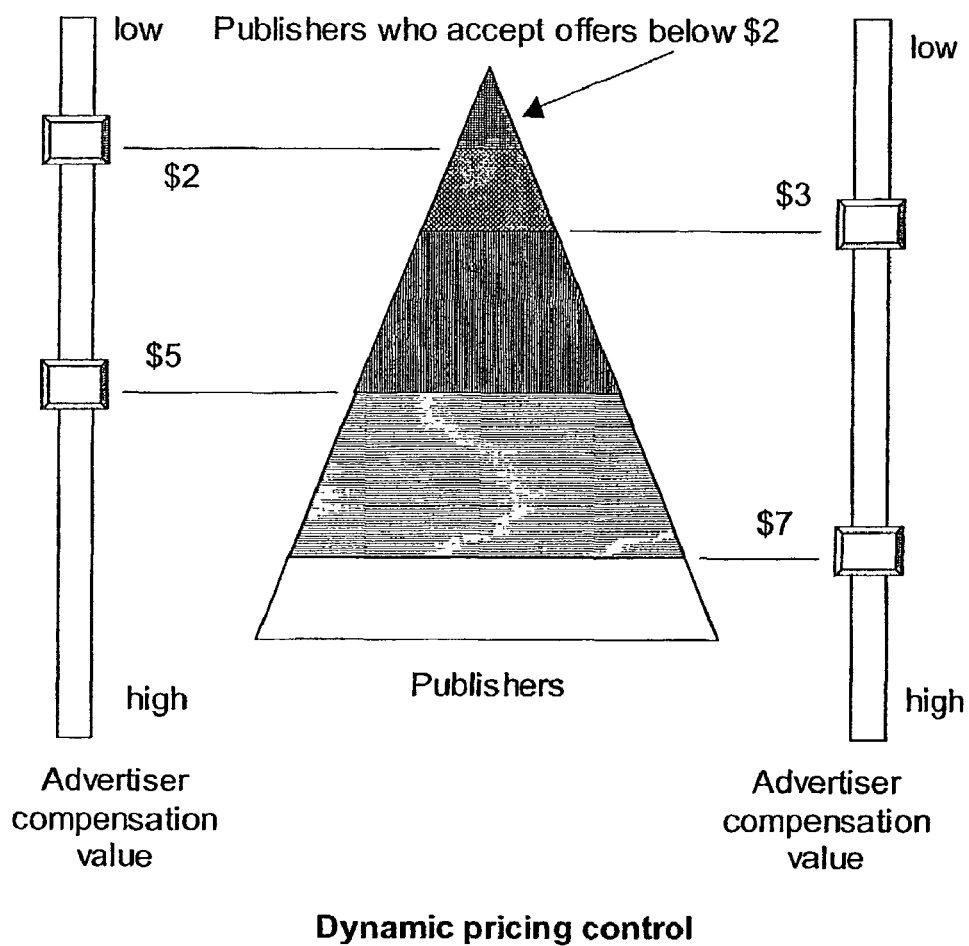
FIG. 14 illustrates how dynamic pricing influences impression volume and reach of an advertisement in accordance with an embodiment of this invention.

As described above, advertisers may monitor and modify their offers dynamically. If their offer is not being accepted by an adequate number of publishers, an advertiser can increase the incentives being offered to attract more publishers. This allows advertisers to control the exposure they get via price modifications. FIG. 14 graphically depicts a simplified benefit of dynamic price control through the exchange system of the present invention. Horizontal lines represent advertiser incentives offered. The area in the triangle above a pricing line represents the number of publishers that accept incentives at or below that level. If the advertiser on the left sets the incentive at $2, only a small number of publishers will accept their offer. If they set it at $5, more publishers are likely to accept their offer.

Conversely, if the ads generate an acceptable number of actions (and hence ad revenue to the publishers), publishers will continue to run the ads. If the actions resulting from running particular ads are poor, publishers can instantly drop those underperforming ads from their sites. The invention provides an automated mechanism for publishers to specify under which conditions they want a particular ad accepted or discontinued. This allows a publisher to have dynamic control (whether manually or through automated processes) over the ads they accept and/or terminate.

Similar to a stock market ticker, the price, embodied as ECPM, is available continuously. Such is not the case with periodic auctions. Rapid control over the price allows the market forces of supply and demand to come into play and dynamically determine the fair market value of the advertising media during any snapshot in time. Both buyers and sellers can rest assured that they are getting the most optimal deal through the most efficient means at any given time.

5.9 Automation

As described above, the exchange system automatically filters and matches advertiser offers to the most appropriate publishers. The results are provided to each individual publisher in rank order. This significantly reduces the amount of work the publisher has to do in selecting appropriate offers. To ease the burden of having to continually monitor changes in accepted offers, the system allows publishers to specify the conditions under which they would accept or reject particular offers. For example, a publisher can specify that if an accepted offer is paying out less than $2 effective CPM, it should be dropped immediately. The result is a maximized yield requiring minimal cost and effort on the part of the publisher.

The automation provided by the system also benefits advertisers by commoditizing their advertising needs and matching their offers with publishers willing to host their ads. Advertisers can adjust their advertising reach by changing the incentives in their offer. This automation enables advertisers and publishers to engage in a higher volume of transactions. Dynamic monitoring and reporting provides the necessary controls to manage the increased volume effectively.

Feedback from advertising performance and automated yield management dynamically uses a process similar to natural selection to terminate offers that are underperforming. The matching and filtering technologies include techniques and software to increase the likelihood of an effective match. In one embodiment, the whole process is automated and optimized. The automation in specifying the accept/reject conditions may be a simplified automated agent. Alternatively, the system is capable of using more sophisticated matching schemes based on ECPM, the intended ECPM, conversion rates, and/or ROI calculations. The agent architecture also provides automation for expanded negotiations.

Additionally, agent APIs and protocols allow external software agents to be plugged into the system. This has the advantage that negotiation algorithms can be totally under the control of the customer. Optimization tools are also provided for optimizing the advertisers' ROI and managing yields for publishers. For example, the optimization tool provides optimization of the advertiser's ROI based on one or more of: number of impressions served on an offer, number of click throughs, number of publishers who accepted an offer, cause for rejection of offers by advertisers, and ECPM of the offer. Publishers' yields are maximized based on one or more of number of impressions served, ECPM of the offer, and click through rate. One embodiment of the publisher's yield optimization method is to continually accept all offers for a number of impressions and then reject all but the top performing offers. An exemplary diagram for the automated process is shown in FIG. 15.

5.10 Overview of One Embodiment

Key objectives are:

1. Provide a smart affiliate exchange mechanism that facilitates the industry's specific requirements. The exchange automates the negotiation process as much as possible and simplifies the advertiser's and publisher's site programming requirements.
2. Operate at acceptable performance levels.
3. Provide accurate and auditable accounting information.
4. As a mission-critical component, the site strives for minimum downtime. The ad servers 401 are the most mission critical components. They should be capable of responding to requests at all time and at adequate performance levels. This is accomplished through redundancy and fail-over mechanisms. The system does not allow unauthorized access, or allow users to corrupt the database 443.
5. Provide a user friendly and intuitive interface for all of the site's visitors (advertisers, publishers and unregistered guests)
6. Facilitate scalability through modular design.
7. Ensure security under password protection mechanisms.
8. Accommodate future enhancements, through a modular design.

The following sets forth descriptions and certain key aspects of the invention's functionality:

1. Exchange: facilitates a trading floor for affiliate programs. A meeting place for advertisers and publishers for the purpose of establishing a (temporary and dynamic) affiliate relationship.
2. Trading Hub: facilitates serving of banners and tracking of all ad related transactions
3. Financial Module: responsible for the generation of statements and invoices as well as handling of accounts receivable and accounts payable. Preferably, the module operates as a standalone unit with data being exchanged manually between the web site and the financial module.
4. Operations: provides all necessary tools for the operation of this mission critical site.

5.10.1 Exchange

When an offer is accepted by a publisher, a contract (Accepted Offer) is formed. However, this contract may be terminated at the wills of each party, or when the conditions specified in the contract and detected by the system are reached. In one embodiment, a contract includes: offer, bid (manual or automated), rejection criteria by the publisher (a publisher can decide to manually review each offer, or have the system automatically accept all new offers matching the specified criteria), definition of the area in which the media is posted, and the like.

The following key functions are provided:

1. Viewing of the trading floor: The system provides aggregate status information about the trading floor. This information is primarily used as a marketing tool.
2. Management of offers and their associated components: Offers can be constructed and modified to meet market dynamics. Obsolete offers are removed from the system
3. Management of acceptances/rejections of traded offers: Acceptances/rejections of traded offers can be constructed and modified to meet market dynamics The Exchange module supports different matching processes. For example it can support manual or automatic matching. When using automated matching of (advertiser issued) offers and (publisher issued) bids, publishers are notified via the alert mechanism of such matches. Actual acceptance of related offers may be done manually or automatically, depending on the publisher's preferences. The matching algorithm will provide users with the functionality to specify those companies with which they (a) are willing to engage in transactions (so-called "inclusionary" categories, such as predetermined complimentary channel buys) and (b) are not willing to engage in transactions (so-called "exclusionary" categories, such as direct competitors of advertisers or products/services) that would offend the audience of publishers.

5.10.2 Trading Hub

The following key functions are provided:

1. Serving of banners for active affiliate relationships
2. Tracking (monitoring and logging) of all trade transactions. The system tracks all predefined events. Currently such events include:
  2.1. Impressions
  2.2. Click-throughs
  2.3. Leads (user definable)
  2.4. Sales
3. Monitoring of start and termination conditions of active affiliate relationships. The system checks for start (e.g. user defined start time) and end conditions (e.g., user defined maximum impressions).
4. Monitoring and delivery of user- and system-defined alerts. The system checks for user-defined (e.g.: 'accept until') and system-imposed alert conditions (e.g.: credit limit exceeded).

In one aspect of the invention, the system logs ail of the events, tracked by the tracking servers, as well as other events, initiated within the exchange module, within a transactional database 443. A log server handles the logging of the advertiser external events. The log server is responsible for, among other functions, the following:

1. Validation of events, based on conditions stored in the database 443. Due to delays inherent in the system, some reported events might not be valid any longer. Such events are not stored within the transactional database 443.
2. Monitoring for A offer- and account-associated thresholds. The following thresholds are being monitored:
  2.1. Number of served banners
  2.2. Number of sale events
  2.3. Advertiser-specific cost 2.4. Credit levels (for advertisers) When thresholds are exceeded, the logging servers will trigger "state" transitions when appropriate, as explained below.

3. Depending on the criticality of the events being monitored for threshold conditions, the logging, server will activate a throttling mechanism, for banner serving.

4. Logging of all events to the transactional database 443. All events are time-stamped.

5.10.3 User Interface

Users interface with the exchange via a client-server (typically web-based) mechanism.

Figure 16:
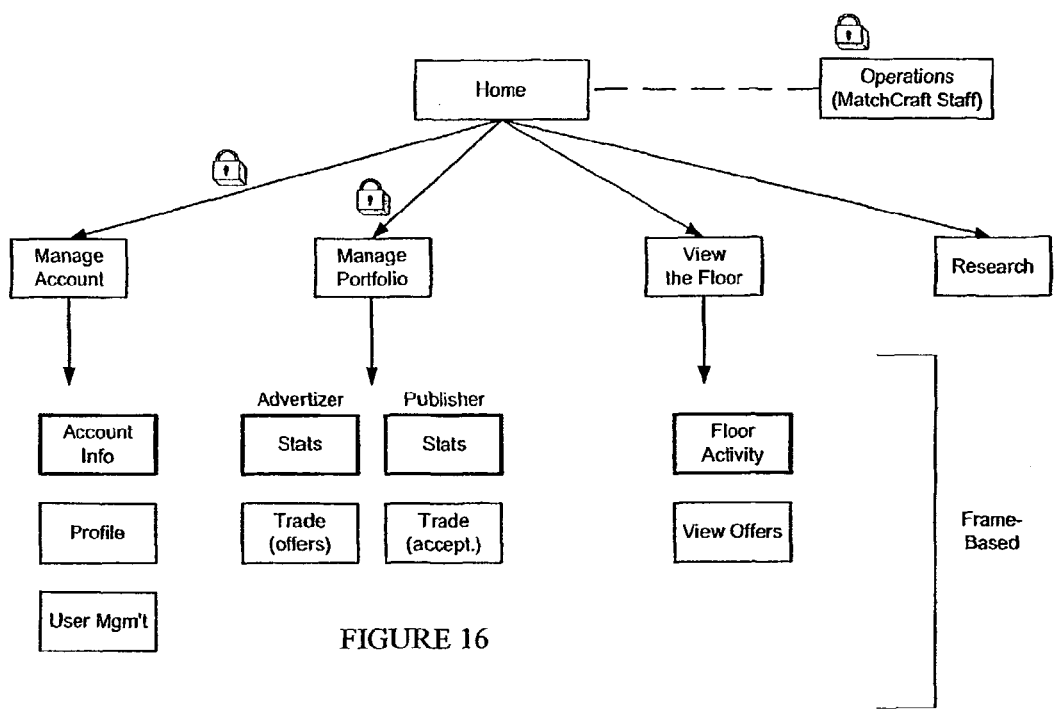
FIG. 16 illustrates a exchange website architecture in accordance with an embodiment of this invention.

The web site contains three areas (sub-sections) that facilitate interaction with the exchange (see FIG. 16). These are:
   Advertiser subsite
   Publisher subsite
   General information about the trading floor The functionality of these sub-sites is described below.

5.10.3.1 Advertiser Sub-Site 5.10.3.1.1 Advertiser Sub-Site Architecture

Figure 17:
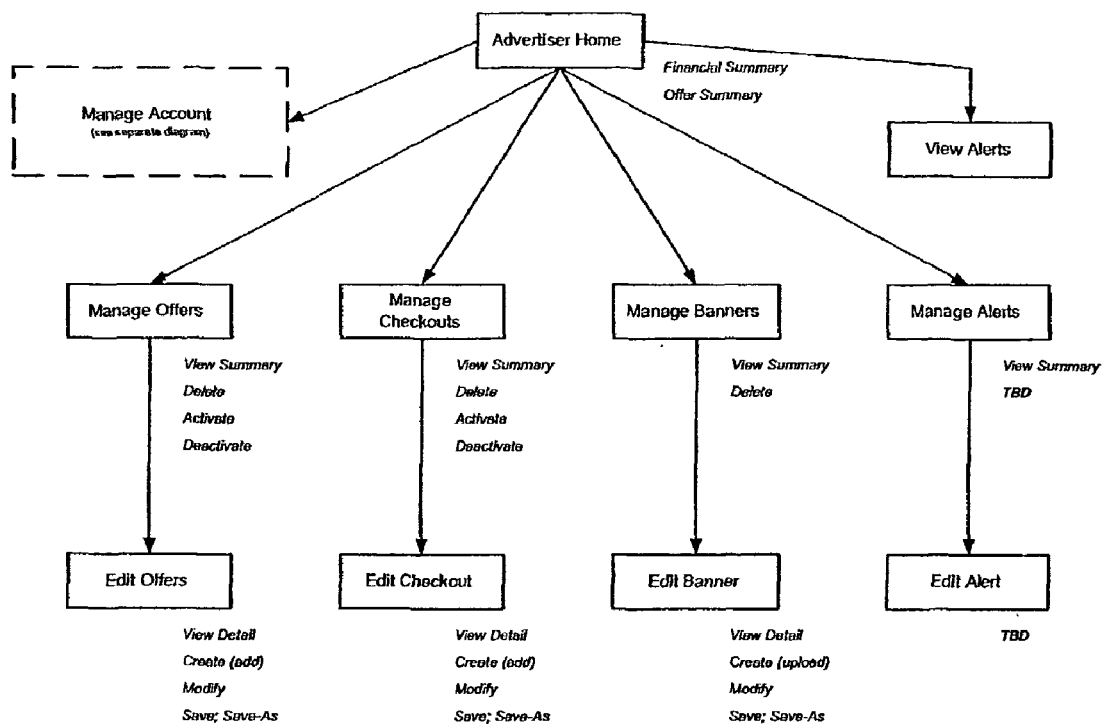
FIG. 17 illustrates a detailed website architecture specific to advertisers in accordance with an embodiment of this invention.

The advertiser's sub-site (see FIG. 17) is implemented as an extranet. Using the login name and system stored user profile, the system identifies the user as an advertiser and displays their private home page. The sub-site contains user-specific data. All future activities For this user are handled from this sub-site.

Pages in this site include three areas:

Header area—displays client company name and user name

Left navigation bar—contains selection buttons/indicators which allow the user access various areas within his/her sub-site.

Main Area—displays function-specific data. Contents of this area are defined through the selection in the left navigation bar.

Footer area—displays local time, based on the user profile

Pages may contain promotional material. Promotional material is context sensitive and is controlled by authorized staff.

5.10.3.1.2 Page Architecture 5.10.3.1.2.1 Advertiser Home Page

Page architecture is shown in FIG. 18.

Main Frame—displays account-specific data:

1. Current month-to-date statistics

The system maintains several user-specific free-running counters that count events and accrued dollar values. Two sets of counters are maintained: daily and monthly. Current month-to-date values comprises the sum of the monthly counter and the current daily counter.

Fields are defined as follows:

1.1. Month-to-date number of impressions:

Total number of impressions served for the advertiser (driven by multiple accepted offers)

1.2. Month-to-date number of click-throughs:

Total number of clicked-through impressions for the advertiser (driven by multiple accepted offers)

1.3. Month-to-date number of leads:

Total number of leads for the advertiser. Leads are advertiser-defined events and are detected at the advertiser-site and tracked by the exchange provider's web site.

1.4. Month-to-date number of sales:

Total number of sales for the advertiser. Sales are detected at the advertiser site ("thank-you" page) and tracked by the exchange provider's web site.

1.5. Month-to-date accrued sales:

Total dollar value of commissionable sales. Commissionable sales are advertiser defined and make up part of the offer, in general, commissionable sales may include the value of an advertised product or the total amount of the shopping cart.

1.6. Month-to-date accrued commissions:

Total dollar value of commissions, due to all of the publishers who have a contract with the advertiser.

Clicking on the title for any of the statistics will display a pop-up screen with a term definition for that field.

2. Financial summary for the last three months

Same information as in the 'current month-to-date' statistics, gathered for the last three months (not including the current month). Additional information includes: previous balance, amount earned/spent during the month, payments/distributions during the month, and new balance.

3. List of current advertiser-specific offers

Tabular summary information, containing a list of the current advertiser specific offers. Information for each offer includes:

3.1. Offer name 3.2. Number of times reviewed (since last modification)

3.3. Number of current acceptances 3.4. Number of current rejections 3.5. Number of impressions (since last modification)

3.6. Number of click-throughs (since last modification)

3.7. Number of sales (since last modification)

3.8. Return on Investment ("ROI") calculation

Under normal system operation, the displayed values may be delayed by a few minutes.

All values displayed are static (i e.: the browser does not refresh automatically)

Offers may be sorted by the following user definable criteria:

4. Ascending/descending date of last modification

5. Ascending/descending ROI

6. Ascending/descending number of acceptances followed by Ascending/descending number of rejections 7. Ascending/descending number of rejections followed by Ascending/descending number of acceptances 8. Offer category; either product category and/or target audience 5.10.3.1.2.2 Offer Manager The offer manager web page (see FIG. 19) is entered by clicking on the 'Manage Offer' button on the left navigation bar.

Note: The 'Manage Offer' indicator is lit (red). This page provides tabular summary information, containing a list of the current advertiser specific offers. Next to each offer, the system provides management buttons. Information for each offer is similar to the one shown in the advertiser's home page and includes:

1. Offer name

2. Thumbnail of creative

3. Number of times reviewed (since last modification)

4. Number of current acceptances

Under normal system operation, the displayed values may be delayed by few minutes.

All values displayed are static (i.e.; the browser does not refresh automatically)

By clicking on the 'current acceptances' field, a pop-up window will display a summary of conditions ('accept until')

Offers may be sorted by the following user-definable criteria:

Ascending/descending date of last modification

Ascending/descending number of acceptances

Each offer has the following management buttons associated with it:

1. 'View detail/Edit'—Copy the offer into an 'editor buffer' for either viewing, modification, or use of the offer as a template for a new offer. By clicking on a the button, the user is taken to the 'Offer Editor' page.
2. 'Enable/Disable'—Toggle the offer state between 'enabled' and 'disabled'
3. 'Delete'—Mark the offer for deletion. This is implemented as a checkbox
4. 'Copy'—Make a copy of the marked offer and name it "Copy of . . . ". The page has two additional buttons 'New' and 'Submit'
5. The 'New' button is used to create a new offer. The user is taken to the 'Offer Editor' page.
6. All changes and commands take effect when the 'Submit' button is clicked.

5.10.3.1.2.3 Offer Editor

This popup page (see FIG. 20) is entered in one of the following two methods:
By clicking on the 'View Details/Edit' button, associated with a specific offer in the 'offer summary' area of the 'Manage Offers' page
  The page will be pre-populated with the details of the selected offer.
By clicking on the 'New' button on the 'Manage Offers' page.
  All fields within the page will be populated with the default values Offer Details This section allows the advertiser to describe the offer
Offer name—Unique descriptor name.
  Text string.
  Entered as text input.
  Verified for correctness and uniqueness
Offer start date & time—Flight start date & time (local time)
  Pull-down items.
  Default—current date & time. Selection should be set for current or future time.
  Verified for correctness Product Details This section allows the advertiser to describe the product
Product name—Product descriptor name.
  Text string.
  Entered as text input.
Product Description—
  Free form text string
  Entered as text input.
Product Price—Product price
  Optional field. When entered, the system uses it for display of statistics such as 'Total accrued sales' and 'ROI'
  Entered as decimal number.

Banner Details

This section allows the advertiser to associate a banner with the offer. The offer can be associated with a pre-defined banner or can spawn a new browser window for defining a new banner, to be used with the offer.
  Banner name—Unique banner name of a previously defined banner.
    Text string.
    Pull-down selection.
  Alt. tag—Alt tag for the banner.
    Text string.
    Pull-down selection.
  'View' button—Opens a popup window, displaying the creative for the selected banner.
  'New' button—Opens a pop-up 'Banner Editor' window.
Target URL This section allows the advertiser to associate a banner target URL with the offer.
URLs are text strings including alphanumeric characters.
All of the URLs are verified for correct structure.

External Advertiser Event Definition

This section allows the advertiser to associate an external advertiser event definition with the offer.

Commission Details

This section allows the advertiser to define the commission structure for the offer. Each activity type is associated with commission.
  Commissions may be paid for the following:
    Per CPM (thousand impressions) (flat rate: dollar value; format: $xx.xxx)
    Per click (flat rate: dollar value; format xx.xxx)
    Per lead (flat rate: dollar value; format $xx.xxx)
    Per 'other' activity (flat rate: dollar value; format: $xx.xxx)
    Per sale. May be paid in one of the following two methods:
      Flat rate (dollar value; format: $xx.xxx)
      Percentage of the shopping-cart contents Offer Limits This section allows the advertiser to define termination events for the offer. Termination events may include:
  End date & time
    Default end time is infinity. End date & time should occur past start time.
    Verified for correctness.
  Maximum number of impressions
  Maximum number of leads
  Maximum number of sales
  Maximum cost o Minimum ROI Target Content Profile This section allows tie advertiser to define a content profile for the ideal publisher, intended to maximize the ROI (and ECPM)
The section includes a list of attributes and associated check boxes. The system will be designed such that that the attribute list can be easily modified by a system administrator.

Target Audience Profile

This section allows the advertiser to define a profile for the ideal publisher's target audience, intended to maximize the ROI (and ECPM)
The section includes a list of attributes and associated check boxes. The system will be designed such that that the attribute list can be easily modified by a system administrator.

Aoffer Statistics

This section provides key statistics for each accepted offer, associated with this offer.

The 'Offer Editor' page has several buttons. These are:
'Reset' button
  Clicking on this button resets the contents of the page to its initial state (i.e., original contents of the offer, in case an offer was edited/reviewed, default values in case of a new offer).
'Cancel' button
  Clicking on this button closes the 'Offer Editor' page, returning the user to the 'Offer Management' page. No changes take place.
'Save' button
  Clicking on this button closes the 'Offer Editor' page, returning the user to the 'Offer Management' page. Modifications to an existing offer are retained.
'Save-As' button
  Clicking on this button closes the 'Offer Editor' page, returning the user to the 'Offer Management' page. The system will store the offer under the name given in the in the 'Offer Name' field. In case the name wasn't modified, the system will prompt with a dialog box, requesting confirmation to overwrite the previous offer. When stored under a different name, the original offer remains unchanged.

5.10.3.1.2.4 Banner Manager

The banner manager web page (see FIG. 21) is entered by clicking on the 'Manage Banners' button on the left navigation bar.

Note: The 'Manage Banners' indicator is lit (red).

This page provides tabular summary information, containing a list of the current advertiser specific banners. Next to each banner, the system provides a 'delete' checkbox. information for each banner includes:
- Banner name—Unique text string
- Creative—Image
- Dimensions—in pixels; Computed by the system
- Size—in kb; Computed by the system
- Type of image—Static or Animated; Determined by the system
- 'Banner Name' and 'Alt. Tag' are editable
- Banners can be marked for deletion by using the 'delete' checkbox next to them.

The page has two additional buttons 'New' and 'Submit'

The 'New' button is used to create a new banner. The user is taken to the 'Banner Editor' page.

All changes and commands take effect when the 'Submit' button is clicked.

5.10.3.1.2.5. Banner Editor

This pop-up page (see FIG. 22) is entered by clicking on the 'New' button on the 'Manage Banners' page.

Note: The 'Manage Banners' indicator is lit (orange).

This page provides tools for the creation of a new banner. The tools provide the advertiser with the ability to:
- Define a unique banner name
- Upload a creative from the client station and save it on the provider's server. Browse buttons are provided for is the definition of source and destination paths.
- View the uploaded creative
- Calculate the size and dimensions (server side)
- Evaluate attributes (server side)
- Define an Alternate Tag The system provides the following additional buttons:

'View' button

Opens a pop-up window, displaying the creative for the selected banner.

'Calculate' button

Populates the 'dimensions', 'size' and 'attributes' fields, based on the uploaded creative.

'Cancel' button

Clicking on this button closes the 'Banner Editor' page, returning the user to the 'Banner Management' page. No changes take place.

'Submit' button

Clicking on this button closes the 'Banner Editor' page, returning the user to the 'Banner Management' page. The new banner is added to the list of advertiser-defined banners.

Upon submitting a banner, the system performs the following checks:
- Validity of the creative: correct format, allowable banner size
- Uniqueness of the banner name

5.10.3.1.2.6 External Advertiser Event Manager

This page (see FIG. 23) is entered by clicking on the 'Manage External Advertiser Events' button on the left navigation bar.

Note: The 'Manage External Advertiser Events' is indicator is lit (red).

This page provides tools for the definition of External Advertiser Events within the advertiser's site. The tools provide the advertiser with the ability to:
- Review existing External Advertiser Events
- Modify External Advertiser Event related parameters:
  - External Advertiser Event name
  - External Advertiser Event IP address
- Each External Advertiser Event entry has a checkbox, allowing the user to mark it for deletion.

The page has two additional buttons 'New' and 'Submit'

The 'New' button is used to create a new External Advertiser Event definition. The user is taken to the 'External Advertiser Event Editor' page.

All changes and commands take effect when the 'Submit' button is clicked.

5.10.3.1.2.7 Alert Handler

The alert handler provides two main functions:

Manage alerts
- Define which alerts should be reported and which should be masked.
  - Following is a list of reportable alerts:
    - Flight-time start (warning and actual event)
    - Flight-time end (warning and actual event)
    - Impression limit reached (warning and actual event)
    - Lead limit reached (warning and actual event)
    - Sale limit reached (warning and actual event)
    - Dollar value reached (warning and actual event)
    - Credit level reached (warning and actual event)
    - ROI threshold exceeded (actual event)
    - Offer is stale (warning and actual event)
- Define alert handling, other than web-based display and issuance of e-mails View alerts A color-coded marker in the advertiser's home page, notifies the advertiser that new alerts were added to the alert log since the last time it was viewed. The alert log uses the following format:

| Date | Time | Alert Level | Offer/Bid | Description |
| --- | --- | --- | --- | --- |
| 02/08 | 16:44 | Medium | Roses | 80% of sales reached |
| 02/08 | 18:23 | High | Roses | 100% of sales reached |
| 04/12 | 07:23 | Medium | Laptop | 48 hours till end of flight-time |
| 04/14 | 07:23 | High | Laptop | End of flight-time |

The user can view the log and manipulate its content through the following commands:
- Mark an entry as read
- Mark an entry for deletion
- Clear the content of the alert log.

5.10.3.2 Publisher Sub-Site

5.10.3.2.1 Publisher Sub-Site Architecture

The publisher's sub-site is implemented as an extranet. Using the login name and system stored user profile, the system identifies the user as a publisher and displays their private home page. The sub-site contains user-specific data. All future activities for this user are handled from this sub-site.

Pages in this site include three areas:

Header area—displays client company name and user name

Left navigation bar contains selection buttons/indicators that allow the user access various areas within his/her sub-site.

Main Area—displays function-specific data. Contents of this area are defined through the selection in the left navigation bar.

Footer area—displays local time, based on the user profile

Pages may contain promotional material. Promotional material is context sensitive and is controlled by authorized staff.

5.10.3.2 .2 Page Architecture 5.10.3.2.1 Publisher Home Page

Main Frame—displays account-specific data:

Current month-to-date statistics
- The system maintains several user-specific free-running counters that count events and accrued dollar values. Two sets of counters are maintained, daily and monthly. Current month-to-date values include the sum of the monthly counter and the current daily counter Month-to-date number of impressions:
- Total number of impressions served by the publisher (driven by multiple accepted offers)

Month-to-date number of click-throughs:
- Total number of clicked-through impressions served by the publisher (driven by multiple accepted offers)

Month-to-date number of leads:
- Total number of leads accrued by the publisher. Leads are advertiser-defined events and are detected at the advertiser site and tracked by the provider's web site.

Month-to-date number of sales:
- Total number of sales accrued by the publisher. Sales are detected at the advertiser site ("thank you" page) and tracked by the provider's web site.

Month-to-date accrued commissions:
- Total dollar value of Commissions, due to the publisher.

Clicking on the title for any of the statistics will display a pop-up screen with a term definition for that field.

Financial summary for the last three months
- Same information as in the 'current month-to-date' statistics, gathered for the last three months (not including the current month).
- Additional information includes:
  - Previous balance
  - Amount earned/spent during the month
  - Payments/distributions during the month
  - New balance List of current publisher-specific accepted offers
- Tabular summary information, containing a list of the current publisher specific accepted offers. Information for each accepted offer includes:
  - Accepted offer name
  - Number of impressions (since last modification)
  - Number of click-throughs (since last modification)
  - Number of sales (since last modification)
  - ECPM Under normal system operation, the displayed values may be delayed by a few minutes.

All values displayed are static (i.e., the browser does not refresh automatically)

Accepted offers may be sorted by the following user-definable criteria:
- Ascending/descending date of acceptance
- Ascending/descending ECPM
- Ascending/descending monetary amount of compensation remaining in account.

List of current publisher-specific bids
- Tabular summary information, containing a list of the current publisher specific bids. Information for each offer includes:
  - Bid name
  - Number of times reviewed (since last modification)
  - Number of current accepted offers, driven by the bid Under normal system operation, the displayed values may be delayed by few minutes.

All values displayed are static (i.e., the browser does not refresh automatically)

Bids may be sorted by the following user-definable criteria:
- Ascending/descending date of last modification
- Ascending/descending number of acceptances driven by the bid 5.10.3.2.2.2 Accepted Offer Manager Clicking on the 'Manage Accepted Offers' button on the left navigation bar enters this page.

In one aspect of the invention, this page provides tabular summary information, containing a list of the current accepted offers. Next to each accepted offer, the system provides management buttons. Information for each accepted offer is similar to the one shown in, the publisher's home page and includes:
- Accepted offer name
- Thumbnail of creative
- Number of impressions (since last modification)
- Number of leads
- Number of sales
- Number of impressions, leads and sales can be displayed as a time-based graph Under normal system operation, the displayed values may be delayed by few minutes.

All values displayed are static (i.e., the browser does not refresh automatically)

Accepted offers may be sorted by the following user-definable criteria:
- Ascending/descending date of last modification
- Ascending/descending ECPM
- Ascending/descending monetary amount of compensation remaining in the account.

Each offer has the following management buttons associated with it:
- 'View detail/Edit'—Copy the accepted offer into an 'editor buffer' for either viewing or modification. By clicking on the button, the user is taken to the 'Accepted Offer Editor' page.
- 'Enable/Disable' —Toggle the accepted offer state between 'enabled' and 'disabled'
- 'Delete'—Mark the accepted offer for deletion. This is implemented as a checkbox The page has an additional button 'Submit'. All changes and commands take effect when the 'Submit' button is clicked.

5.10.3.2.2.3 Accepted Offer Editor

This pop-up page is entered in one of the following two methods:
- By clicking on the 'View Details/Edit' button, associated with a specific accepted offer in the 'Manage Accepted Offers' page. The page will be pre-populated with the details of the selected accepted offer.
- By clicking on the 'New' button on the 'Manage Accepted Offers' page. All fields within the page will be populated with the default values.

The page includes several items:

Offer Details

This read-only section allows the publisher to view the offer details
- Offer name—Unique descriptor name. Text string.
- Offer start date & time—Flight start date & time (local time)

Product Details
This read-only section allows the publisher to view the offer details
Product name—Product descriptor name— Text string.
Product Description—Free-form text.
Banner Details This read-only section allows the publisher to view the banner details
Banner name—Unique banner name of a previously defined banner. Text string.
Alt. tag—Alt tag for the banner. Text string.
'View' button—Opens a pop-up window, displaying the creative for the selected banner.
Target URL
A text string (link) describes the URL. Clicking on the URL will pop up a window, displaying the target URL.
Commission Details
This read-only section allows the publisher to view the commission details
Per CPM (thousand impressions).(flat rate dollar value; format: $xx.xxx)
Per click (flat rate: dollar value; format $xx.wxx)
Per lead (flat rate: dollar value; format: $xx.xxx)
Per 'other' activity (flat rate: dollar value format: $xx.xxx)
Per sale. May be paid in one of the following two methods:
Flat rate (dollar value; format: $xx.xxx)
Percentage of the shopping-cart contents
Offer Limits
This read-only section allows the publisher to view the termination conditions for the offer, set by the advertiser— Termination events may include:
End date & time
Maximum number of impressions
Maximum number of leads
Maximum number of sales
Maximum cost
Minimum ROI
Target Content Profile
This read-only section allows the publisher to view a content profile for the ideal publisher, intended to maximize the ROI (and ECPM). The section includes a list of attributes.
Target Audience Profile
This read-only section allows the publisher to view a profile for the ideal publisher's target audience, intended to maximize the ROI (and ECPM). The section includes a list of attributes.
Acceptance Conditions
This section allows the publisher to define acceptance conditions (follows the current 'Accept Until' feature). The section includes a list of attributes and associated checkboxes.
The 'Accepted Offer Editor' page has. several buttons. These include:
'Reset' button
Clicking on this button resets the contents of the page to its initial state (i.e.: original contents of the accepted offer, in case an acceptance was edited/reviewed, default values in case of a new accepted offer).
'Cancel' button
Clicking on this button closes the 'Accepted Offer Editor' page, returning the user to the 'Accepted offer Management' page. No changes take place.
'Save' button
Clicking on this button closes the 'Accepted Offer Editor' page, returning the user to the 'Accepted Offer Management' page. Modifications to an existing accepted offer are retained.

5.10.3.2.2.4 Alert Handler
The alert handier provides two -main functions:
Manage alerts
Define which alerts should be reported and which should be masked. Following is a list of reportable alerts;
Flight-line start (warning and actual event)
Flight-time end (warning and actual event)
impression limit reached (warning and actual event)
Lead limit reached (warning and actual event)
Sale limit reached (warning and actual event)
Dollar value reached (warning and actual event)
Offer removed by the system (actual event)
Offer removed by the advertiser (actual event)
Compensation changed (actual event)
Creative changed (actual event)
ECPM threshold exceeded (actual event)
Bid is stale (warning and actual event)
Define alert handling, other than web-based display and issuance of e-mails
View alerts
A color-coded marker in the publisher's home page, notifies the publisher that new alerts were added to the alert log since the last time it was viewed. In one embodiment, the alert log uses the following format:

| Date | Time | Alert Level | Offer/Bid | Description |
| --- | --- | --- | --- | --- |
| 02/08 | 16:44 | Medium | Roses | 80% of sales reached |
| 02/08 | 18:23 | High | Roses | 100% of sales reached |
| 04/12 | 07:23 | Medium | Laptop | 48 hours till end of flight-time |
| 04/14 | 07:23 | High | Laptop | End of flight-time |

Figure 24:
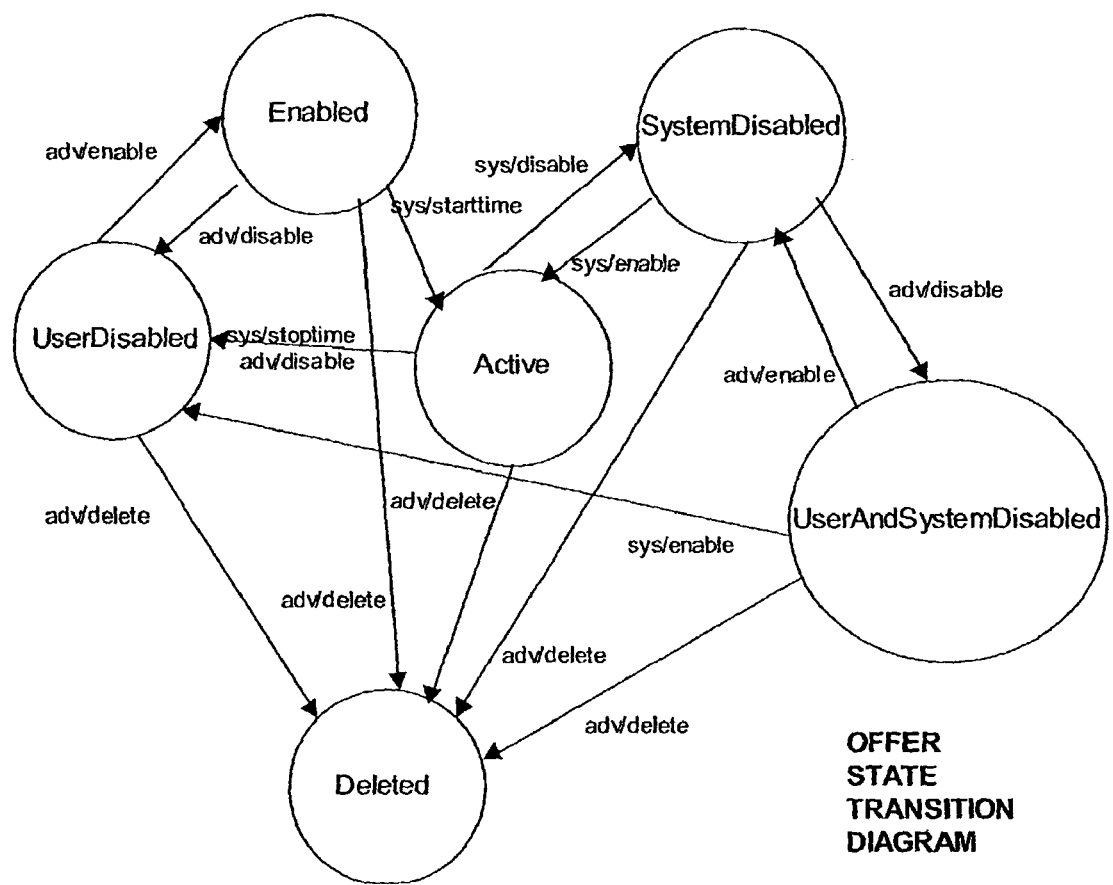
FIG. 24 illustrates an offer state transition diagram in accordance with an embodiment of this invention.
Figure 25:
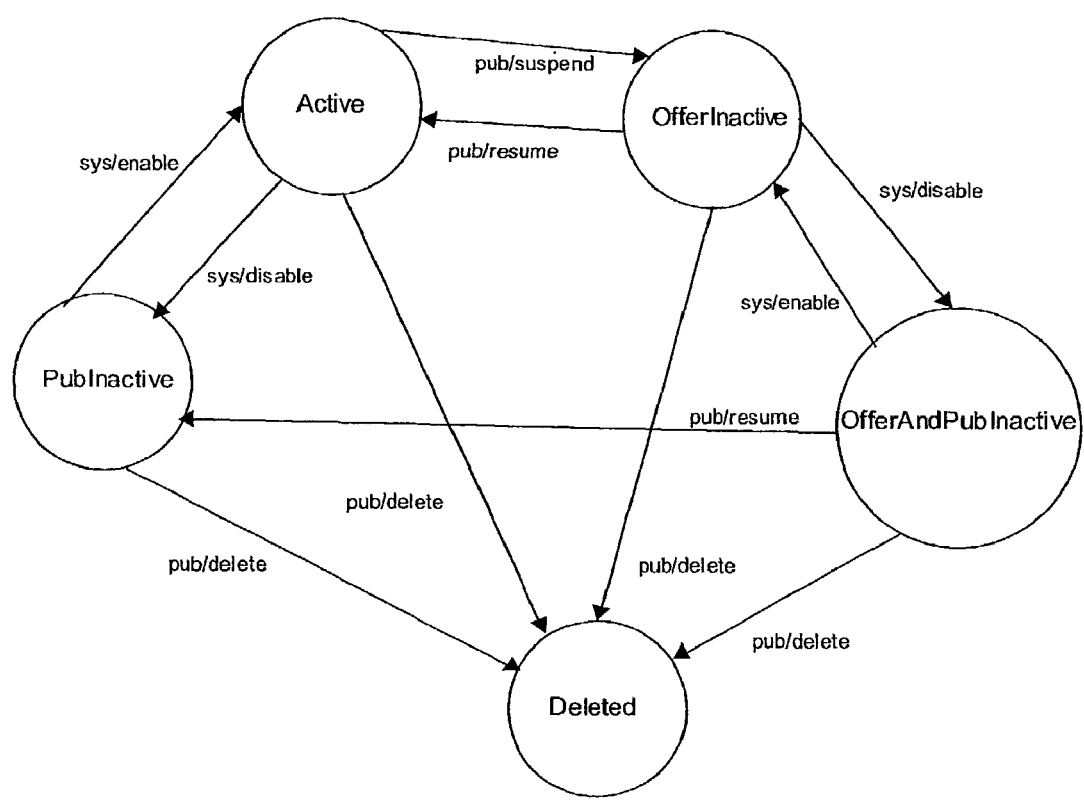
FIG. 25 illustrates a contract state transition diagram in accordance with an embodiment of this invention.
Figure 26:
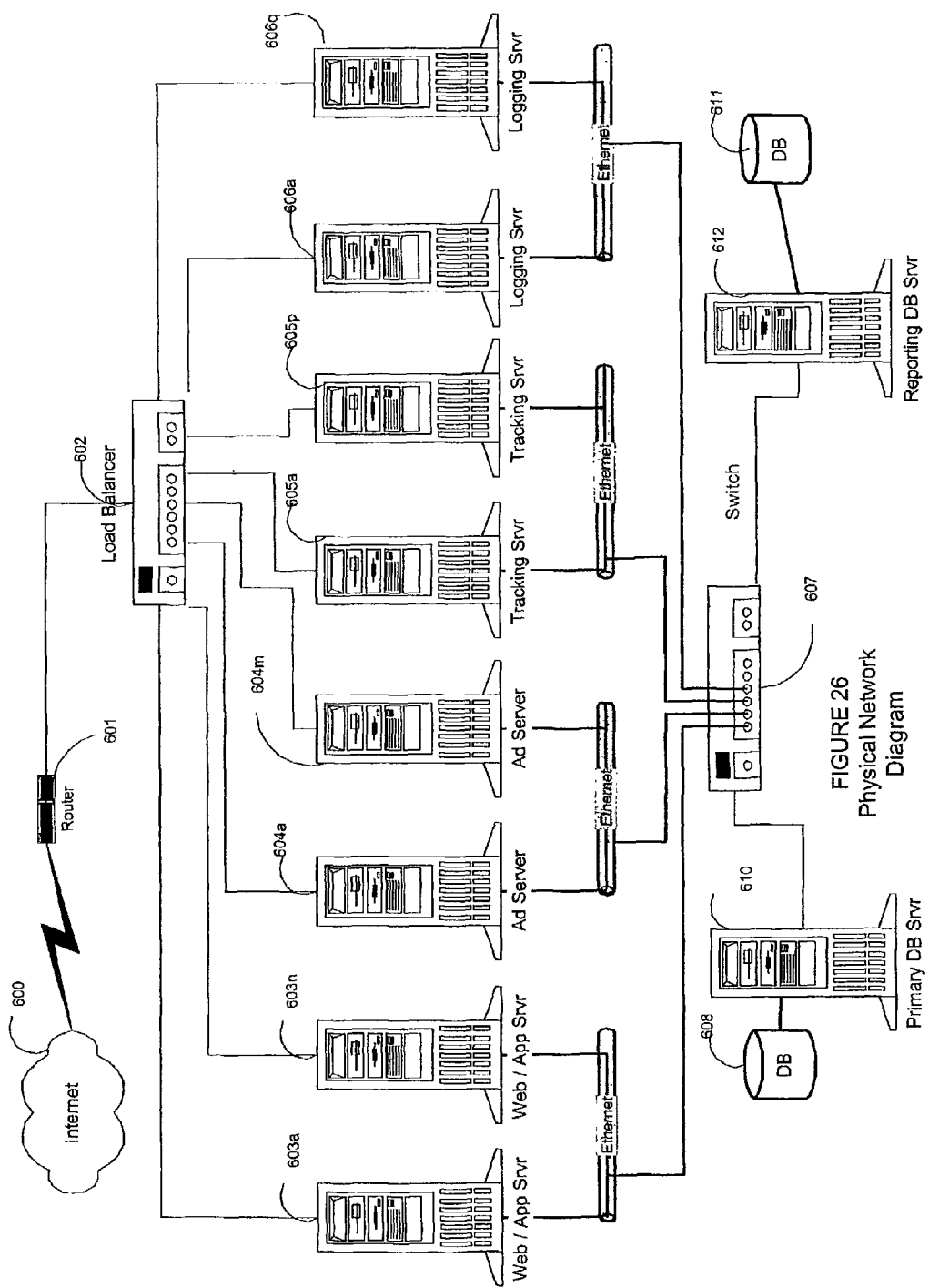
FIG. 26 illustrates a physical network diagram in accordance with an embodiment of this invention.
Figure 27:
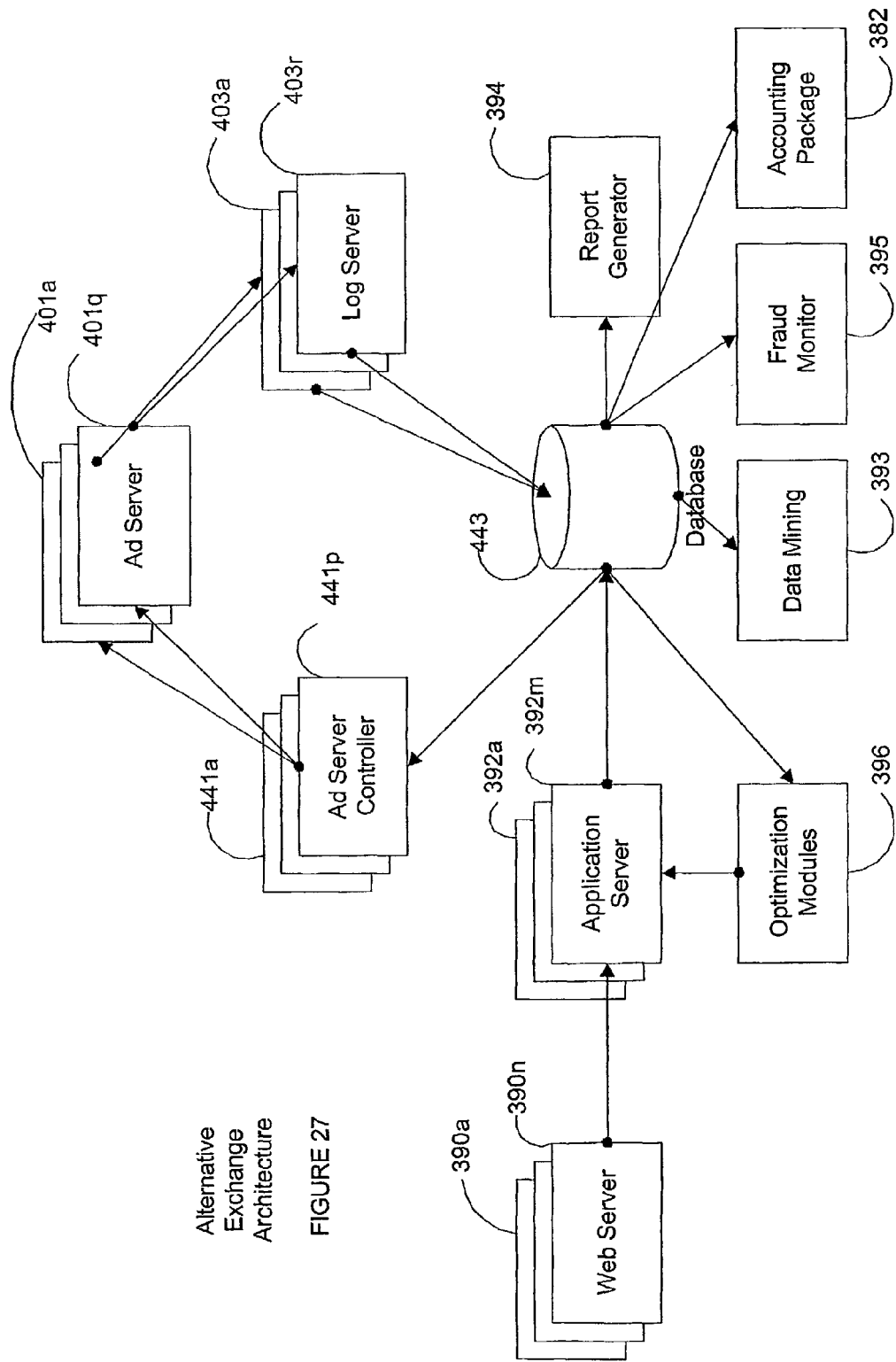
FIG. 27 illustrates a system architecture in accordance with an embodiment of this invention.

The user can view the log and manipulate its content through the following commands:
Mark an entry as read
Mark an entry for deletion
Clear the content of the alert log—
5.10.4 State Diagrams
5.10.4.1 Offer State Transitions
Offers can be in the following states (see FIG. 24):
UserDisabled (initial state). In this state, offers cannot have new acceptances, nor can they be run.
Enabled. In this state, offers can be accepted, but cannot be run-typically because the start time of the offer has not been reached.
Active. In this state, offers can be accepted and also run.
SystemDisabled. In this state, offers cannot have new acceptances, a-rid are not running. An offer gets into this state only via system events.
UserAndSystemDisabled. In this state, offers cannot have new acceptances, and are not running.
Deleted. Marked as deleted. In this state, offers cannot have any new acceptances ever again and cannot run ever again.
5.10.4.2 Contract (AOffer) State Transitions
Contracts (AOffer) car, be in one of the following states (see FIG. 25):
OfferInactive. In this state, the aoffer is inactive because its associated offer has become inactive (i.e., any state other than Active)—No banners will be shown.
Active. In this state, the aoffer and its offer are active, and banners will be shown.

PubInactive. In this state, the aoffer is inactive because the publisher has disabled the aoffer. The corresponding offer is active. No banners will be shown—

PubAndOfferInactive. In this state, the aoffer is inactive because the publisher has disabled the aoffer and the associated offer is inactive. No banners will be shown.

Deleted. Marked as deleted.

The initial state may be either OfferInactive or Active, depending on the state of the offer when the aoffer was created.

5.10.5 Reporting

In one embodiment of the invention, a number of reports are generated that continuously create opportunities for enhanced performance to the recipients of the information.

Reports can be generated on demand or periodically. Example reports include:

1. Average compensation for each product category within my domain (taxonomy), stratified by its components
2. System-wide average ECPM
3. Average ECPM per publisher category (as defined by its taxonomy)
4. Per offer, correlation values of publishers who have accepted the offer (e.g. 3 publishers from 'Computers', 5 publishers -from 'Sport')
5. Average offer compensation (stratified by its components) for all other advertisers within my category (as defined by the advertiser's taxonomy)
6. Conversion ratios
7. Exchange status including number of advertisers, publisher, offers, active offers, inactive offers, contracts, bids.
8. Top ten lists such as highest ECPM offers, highest click incentive, best converting banners.

Reports can be generated over various time granularities to view changes in performance over time. Example time granularities include last year, year to date, last. three months, last month, month to date, last week, yesterday, today, or a specific begin and end date/time.

Reports Can be generated over various channel granularities. For example, the performance of an offer can be viewed overall, or the performance data can be drawn only from activity on sites with particular content and audience profiles.

5.10.6 Calculation of ECPM

ECPM is a single metric by which the effectiveness of the advertising can be measured. It is defined as the value of the advertising divided by the number of impressions served. For a publisher, this is a yield metric which can be used to determine which advertising is maximizing dollars earned -for impressions served. For an advertiser, ECPM can be used to compare the effectiveness of offers that have identical incentives. This is good for comparing creatives, ad copy, or product price points to see what is generating the best conversion.

The ECPM calculation is:

$$(\text{dollar value}) / (\text{impressions delivered})) * 1000$$

For instance, if $25.00 were made on 15,000 impressions delivered, this would be an effective CPM of:

$$(25 / 15000) * 1000 = \$1.66 \text{ ECPM}$$

5.10.7 Calculation of Future ECPM

The concept of "Future ECPM" is only relevant in an environment where the incentives associated with advertising are changing. The future ECPM 138 computed using historical event counts, or conversion ratios, and the current incentive levels.

The computation of future ECPM is:

$$((\text{predicted value}) / (\text{impressions delivered}) * 1000$$

The "Predicted value" is:

$$\text{Sum(current incentive level * historical event count) for all event types}$$

For example, "offer a" has an ECPM of $2.12, but if the advertiser starts paying $0.15 a click, the ECPM of a publisher that picks it up after the incentive change will

|  | Impressions | Clicks | Leads | Sales |
| --- | --- | --- | --- | --- |
| Incentive | $0.00 | $0.10 | $1.50 | $10.00 |
| Events Measured | 100,000 | 1,250 | 25 | 5 | be $2.75. For publishers that already accepted the offer, their overall compensation will tend towards an ECPM of $2.75.

5.10.8 Audience/Content Match Indices

The goal of the match indices is to provide a single number between 0 and 100 that indicates the "goodness" of a match between an advertiser's offer and a publisher's area. This index is computed for audience demographics and for content. The computation is performed on information provided by the publishers (content providers) and advertisers. The advertisers are indicating what content and audience the ad will work best with. The publishers are indicating what their content and audience makeup is.

The audience data has weights associated with each data point. This allows advertisers to say how important this audience is to them and publishers to indicate what percentage of their audience makeup has this demographic. For instance, we might have three sites as follows (the number in parenthesis as the weight, a number in between 1 and 5):

|  | Content | Audience |
| --- | --- | --- |
| site a | Auto | age 18-25 (3), auto-buyer (1) |
| site b | Auto, museum | age 35-44 (4) |
| site c | Auto | age 35-44 (4), auto-buyer (4) |

Now if we have an advertiser offer that looks like the following:

|  | Content | Audience |
| --- | --- | --- |
| offer a | Auto, museum | age 35-44 (3), auto-buyer (5) |

For example, the advertisement is for a luxury automobile manufacturer using a creative of a couple coming out of an auto in front of an art museum.

The resulting match indices are:

|        | Content | Audience |
|--------|---------|----------|
| site a | 70      | 35       |
| site b | 100     | 50       |
| site c | 70      | 86       |

The highest score of 100 indicates an exact match which we only got once for the content of site b. The lowest index b we got was 35 it was non-zero because of the overlap of auto-buyer but the audience is the wrong age and relatively few of them are auto buyers.

A significant factor in the development of the algorithm is that it has to be trivial to compute. Frequently a large number of these indices have to be computed while a user is waiting. This data is not amenable to caching (the space for the cached values would be prohibitively large) so we need to compute it quickly on-the-fly.

Another factor in developing the match algorithm was that its results had to be similar to what you'd get by "common sense". This is also sometimes known as the principle of "least surprise". So, if the match index shows that a particular match is better than another, we expect that a human would also consider the same match to be better.

The content match algorithm is:

$$100 * \text{sqrt} (\#\text{matches} / \max(\text{length}(\text{offerProfile}), \text{length}(\text{areaProfile})))$$

In this way, a large profile (e.g. a publisher that checks most of the content categories) will dilute the score if an advertiser has only selected a few items in the pro-file and vice versa. Since the matching is so sensitive to dilution, we use a square root to get reasonable matches to have scores closer to 100.

The audience match is slightly complicated by the weights:

$$100 * \text{sort} ( \text{sum}(\text{adv item weight} * \text{pub item weight}) / (5 * \text{sum} (\text{weights} (\text{adv profile}))))$$

The dilution is handled differently here on the assumption that an audience member may have more interests than just those specified without that being detrimental to the quality of the match. However, an advertiser looking for a large number of attributes does dilute the result.

5.11 Synopsis

In one aspect, the present invention is a method implemented on a computer network that allows for media and space for displaying media to be exchanged in real time between a plurality of advertisers and a plurality of publishers connected to the network by a plurality of respective terminals comprising the steps of: a) storing a plurality of offers for media spaces submitted by the plurality of advertisers, wherein each offer includes information about the media content, and a monetary compensation structure offered to be paid upon acceptance; b) displaying offers to individual publishers in a rational order through correlated parameters input by advertiser and publisher; c) sorting offers based on (i) information provided by publishers and advertisers; or (ii) sorting offers for display to individual publishers based on demographic, psychographic, geographic and other taxonomies input during the registration process by advertiser and publisher alike, or (iii) sorting offers on the basis of dollar per action, click-through, lead, distribution or combination thereof d) accepting by the publisher of one or more of the ordered offers; e) creating an instantaneous "liquid contract" for the accepted offer; f) serving the media content for the contracted offer to the publisher's terminal according the information in the offer; and g) maintaining the status of the contract in accordance with the information contained in the accepted offer until modified by advertiser or rejected by publisher. The method further comprises the step of updating the status of the contract based on information provided in the offer, the step of allowing the advertiser who placed the accepted offer to modify the terms of the contract, or the step of instantly ceasing the serving of media upon a publisher's rejection or a previously accepted offer.

In another aspect, the present invention describes a method implemented on a computer network for providing an exchange for the purchase of advertising spaces by advertisers from publishers, comprising a) storing offers submitted by advertisers for the purchase of an advertising space for an advertisement, wherein each offer includes a description of the advertisement and a compensation rate for the placement of the advertisement in an advertising space; b) storing conditional offers submitted by publishers for the sale of advertising spaces, wherein each conditional offer contains acceptance criteria for offers submitted by advertisers; c) compiling for a conditional offer a list of offers that satisfy the acceptance criteria; d) accepting one or more offers from the list by a publisher, and e) serving the advertisement described in the accepted offer when the publisher accepts the offer.

The method further comprises the steps of determining for an offer the number of acceptances of the offer, outputting the number of acceptances to the advertiser who submitted the offer, and allowing the advertiser to modify the terms of the offer, whereby an advertiser may modify the terms of an offer in order to increase the number of acceptances of the offer. The method is also capable of performing the steps of determining for each accepted offer that results in the placement of an advertisement in an advertising space, the compensation due the publisher for the placement of the advertisement in the advertising space, outputting the compensation to the publisher who accepted the offer, and allowing the publisher to revoke acceptance of the offer.

In another aspect, the invention describes a networked media exchange system for matching and tracking of offers to purchase advertising space comprising: a plurality of advertisers' terminals for connecting a plurality of advertisers to the network for placing a plurality of offers for media spaces; a plurality of publishers' terminals for connecting a plurality of publishers to the network for reviewing the placed offers on the network and selectively accepting one or more offers; a first server subsystem for arranging the placed offers based on information provided by each of the plurality of publishers and creating an instantaneous contract between an advertiser and a publisher when the publisher accepts an offer placed by the advertiser; and a second server subsystem for executing transactions according to information provided in the offer.

In another aspect, the invention discloses a method by which a plurality of advertisers can enter a liquid contract with a plurality of publishers which is transparent, fully automated, does not require a one-to-one negotiation, and supports anonymity for the publishers on the exchange. The invention may also be described as a method to turn into a commodity the purchasing and selling of online media, and/or a method to turn into a commodity the purchasing and selling of offline media.

The invention creates a metric (ECPM) to allow both publisher and advertiser to not only purchase and sell media at the then-current fair market value, but also to use historical ECPM to reasonably predict future performance. ECPM may be defined as the creation of a method of representing cost performance of media across channel, globally or by advertiser. A feature of the invention is a method to maintain publisher anonymity from advertisers so that CPM transactions (at rates higher than ECPM) can be maintained with the same advertisers. Another feature of the present invention calculates the return on investment (ROI) at any given period in time for advertisers and decide on behalf of publishers through automated processes whether to continue to maintain an active offer.

In another aspect, the invention includes a process by which the traditional principles through which a binding contract is formed (offer, acceptance, consideration) is, for purposes of market efficiencies transformed into a "liquid contract" that allows multiple parties on both sides of the transactions to accept offers simultaneously, and also terminate accepted offers, and even reaccepted terminated offers.

In yet another aspect, the invention includes a method by which the parties participating in the purchase and sale of media can realize price discovery for the space. Under current methods (auction, blind auction, reverse auction, networks, one-to-one negotiations, and/or markets) the parties lack full information and lack a method to truly achieve the fair market value of the space purchased and sold.

In another aspect, the invention includes a method by which the purchase and sale of media is facilitated by allowing the advertiser to test the effectiveness and cost of media through the low cost of entering/exiting contracts, combined with the ability to constantly alter creative aspects of advertising campaigns.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention.

Certain levels of tracking and logging errors are allowable.

5.12 Certain Defined Terms

Source:
littp://www.internetadvertising.org/qa/glossary.shtml

Ad Serving: A software package or a service that responds to requests from browsers to provide advertising content, typically-banners.

Advertising Network: A group of Web sites which share a common banner server. Typically a sales organization which manages the commerce and reporting. An ad network has the ability to deliver unique combinations of targeted audiences because they serve your banner or ad across multiple sites.

Animated GIF: An animation created by combining multiple GIF images into one file. The result is multiple images, displayed one after another, that give the appearance of movement. Very useful for attracting/distracting Web surfers.

Banner: Typically a rectangular graphic element which acts as an advertisement on the Web and entices the viewer to click on it for further information, typically on the advertiser's Web site.

Banner Network: See Advertising Network above.

Branders: Advertisers primarily interested in promoting name recognition for their brand.

ClickThrough: The act of clicking on a banner or other ad, which takes the user through to the advertiser's Web site. Used as a- counter point to impressions to judge the response-inducing power of the banner.

ClickThrough Rate (CTR): The response rate of an online advertisement, typically expressed as a percentage and calculated by taking the number of clickthroughs the ad received, dividing that number by the number of impressions and multiplying by 100 to obtain a percentage. Example: 20 clicks/1,000 impressions=0.02×100=2% CTR.

CPA: Cost Per Action. The price paid by an advertiser for each "action" that a content site delivers. "Action" may be a sale, a lead, a successful form fill-out, a download of a software program or an e-commerce sale of a product. Both the action, price and terms of a CPA purchase are mutually agreed upon by the advertiser and content site and such a purchase typically involves a back end tracking system provided by the advertiser that allows the content site to view clicks and actions every 24 hours if they choose to do so.

CPC: Cost Per Click. The price paid by an advertiser to a content site. When buying on a Cost Per Click model, the advertiser and content site have mutually agreed that the content site will continue to display the advertiser's ad creative until X number of clicks have been delivered—the amount purchased. This pricing model typically ranges between 10 cents CPC up to $2 CPC and as with other forms of online advertising, is dependent on content, audience reached and targeted delivery—Untargeted being lower priced, targeted to an affluent audience being at the high end of the rate scale.

CPM: Cost Per Thousand (Roman Numeral) impressions. The price paid by an advertiser for a content site displaying their banner 1,000 times.

CPS: Cost Per Sale. The price paid by an advertiser to a content site for each sale that results from a visitor who is referred from the content site to the advertiser's site. This type of buying model is typically tracked with cookies, where the cookie is offered on the content site and read on the advertiser's site at the success page after successful completion of one transaction/sale. Typical rates/bounties range between 5% and 25% of the retail price of the product or service being sold. See also CPA above.

Creative: The concept, design, and artwork that go into a given ad.

Demographics: Common characteristics that allow for population segmentation. Typical demographic data points include age, gender, postal code, and income.

Direct Marketers: Advertisers primarily interested in eliciting tangible responses such as sales.

Effective CPM: A metric for the cost of advertising when it is not paid entirely by CPM. Computed by dividing the cost of the advertising by the number of impressions used.

Effective Frequency: The number of times an ad should be shown to one person to realize the highest impact of the ad without wasting impressions on that individual.

Effective Reach: The number of people who will see an ad the most effective number of times. The most effective frequency.

Exposures: See impression

Frequency: The number of times a given person will see an ad in a given time period.

GIF: Graphical Interchange Format. The most common file compression format for banner ads and most other pictures on the Web.

Hits: Every time a file is sent by a server, be it text, graphic, video, and so on, it is recorded as a- hit. Not a reliable gauge to compare different sites, as ore page with five graphic elements will register six hits when viewed, while a page with no graphics will only register one hit.

Impression: The Opportunity To See (OTS) a banner or other ad by a surfer. When a page that includes a banner is viewed, it is considered an impression.

Interstitial Ads: Web pages that pop up between what the viewer is looking at and what they are expecting to get. More like a TV commercial than anything else on the Web (at the moment).

Inventory: The amount of available space for banners on a Web site that can be delivered in a given time period. Also known as the amount of gross impressions per month (or clicks if the publisher is selling on a Cost Per Click rate model) available for sale to advertisers by a Web publisher.

Link: A hypertext connection between two documents, image maps, graphics, and the like.

Liquidity: The ability of an asset to be converted into cash quickly and without any price discount. A larger number of buyers and sellers tends to increase the liquidity of a market.

Pageview: When a Web page is requested by somebody through a browser. Pageviews are often used to track the number of impressions a banner gets.

Proxy: A proxy server acts as a cache file for an organization. It is also used where firewalls protect the internal network from the external Internet, while continuing to serve Web pages from the inside.

Psychographics: Common psychological characteristics that allow for population segmentation. Typical psychographic data points include opinions, attitudes, and beliefs about various aspects relating to lifestyle and purchasing behavior.

Reach: The total number of people who will see a given ad.

Sell-Through Rate: The percentage of banner or other ads sold as opposed to traded or bartered in an ad network.

Session: A completed visit to a Web site by a surfer/viewer/visitor. A session can start at the home page and last anywhere from mere moments to hours, depending on the interest the visitor has in the information, games, and so on, at the site.

Traffic: The number and types of people who come to a Web site. Measured in many different ways.

Transaction Model Exchange: A transaction -model exchange provides all the information necessary to make a buy/sell decision and performs the actual transaction. In contrast, an informational model exchange provides some but not all the information necessary for a buy/sell decision. Therefore, the actual transaction occurs outside of an informational exchange. The revenue potential of an informational exchange is limited to subscription fees. Transaction exchange can, in addition, charge for services related to performing transactions (e.g., a per transaction commission). Therefore, a transaction exchange can be substantially more lucrative.

URL: Uniform Resource Locator. The address of any particular page on the World Wide Web, seen as www.company.com/page.shtml.

Note that, we use terms such as "all" or "always" to describe certain aspects of our preferred embodiment. While the preferred embodiment is so limited, the claims are not; rather, the claims are limited only by their own terms, not by limitations described in the preferred embodiment.

The invention claimed is:

1. A computer system configured to provide an online media exchange, the computer system comprising:
   a web server configured to provide a user interface to advertisers and publishers accessing the online media exchange;
   one or more application servers configured to:
      manage data objects associated with respective advertisers and publishers and further configured to manage online negotiations between advertisers and publishers regarding placement of advertiser ads on publisher websites; and
      automatically match advertiser offers to publishers and rank the advertiser offers,
      wherein the one or more application servers are further configured to match the advertiser offers based on: an effective cost-per-thousand impressions (ECPM), an intended ECPM, conversion rates, and return-on-investment calculations; and to rank the advertiser offers based on the matching;
   a database in communication with the one or more application servers, the database storing data including the data objects; and
   one or more ad servers in communication with the database, the one or more ad servers configured to automatically serve data defining advertiser ads that match a contracting publisher's websites, to an end-user when the end-user navigates to the publisher's websites.

2. The computer system of claim 1 further comprising:
   an ad server controller in communication with the database and the one or more ad servers and configured to convey advertising data from the database to the one or more ad servers.

3. The computer system of claim 1 wherein the one or more ad servers are configured to
   receive an online request from a consumer, the online request specifying a contracting publisher and an ad;
   record data regarding the online request; and
   redirect the consumer to an advertiser website based on data of the request, the advertiser website being associated with a contracting advertiser.

4. The computer system of claim 3 wherein the one or more ad servers are further configured to:
   receive a subsequent request from the consumer, subsequent request including data specifying an action performed by the consumer at the advertiser website;
   record data regarding the action, the data being recorded in association with contract data linking the contracting advertiser and the contracting publisher.

5. The computer system of claim 1 further comprising an accounting package in communication with the database, the accounting package configured to manage billing among the advertisers and the publishers.

6. The computer system of claim 1 wherein the web server is configured to receive an offer from an advertiser.

7. The computer system of claim 6 wherein the web server is configured to detect in the offer one or more of
   a creative,
   a product offer,
   a flight time,
   a maximum pay-out amount,
   a compensation amount,
   a per click payment amount,
   a per download payment amount, and
   a publisher content description.

8. The computer system of claim 6 wherein the web server is configured to provide data about responses to the offer from publishers.

9. The computer system of claim 6 wherein the web server is configured to receive modifications to the offer or modified offers.

10. The computer system of claim 1 wherein the web server is configured to receive ad preference data from a publisher for ads to be hosted by the publisher.

11. The computer system of claim 10 wherein the web server is configured to detect in the ad preference data one or more of
   creative properties,
   a minimum acceptable incentive level,
   a minimum effective cost per thousand impressions (ECPM), and
   minimum expected flight duration.

12. The computer system of claim 1 wherein the one or more application servers are further configured to filter the advertiser offers according to publisher-specified filtering criteria.

13. The computer system of claim 1 wherein the one or more application servers are configured to monitor and log trade transactions between advertisers and publishers.

14. The computer system of claim 1 wherein the one or more application servers are configured to monitor start conditions and termination conditions of trade transactions between advertisers and publishers.

15. The computer system of claim 1 wherein the one or more application servers are configured to determine an effective cost per thousand impressions for trade transactions between advertisers and publishers.

16. The computer system according to claim 1, wherein the web server is adapted to:
   receive data that defines how important an audience is to an advertiser,
   receive data that defines a demographic makeup of a publisher's audience; and
   the one or more application servers are adapted to:
   match advertiser offers based on the data that defines how important an audience is to an advertiser and data that defines the demographic makeup of the publisher's audience, and
   produce a score, wherein a higher score indicates a closer match.

17. The computer system according to claim 1, wherein the one or more application servers are adapted to match advertiser offers to publisher's based on an algorithm that adheres to the principle of "least surprise."

* * * * *